US012238472B2

(12) United States Patent
Chen et al.

(10) Patent No.: US 12,238,472 B2
(45) Date of Patent: Feb. 25, 2025

(54) METHOD FOR DETERMINING WEARING STATUS OF WIRELESS EARPHONE AND RELATED APPARATUS

(71) Applicant: HUAWEI TECHNOLOGIES CO., LTD., Guangdong (CN)

(72) Inventors: Haiying Chen, Hangzhou (CN); Liangfang Qian, Hangzhou (CN); Linxing Xi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 17/956,984

(22) Filed: Sep. 30, 2022

(65) Prior Publication Data

US 2023/0022327 A1 Jan. 26, 2023

Related U.S. Application Data

(63) Continuation of application No. PCT/CN2021/085300, filed on Apr. 2, 2021.

(30) Foreign Application Priority Data

Apr. 3, 2020 (CN) ........................ 202010258894.X

(51) Int. Cl.
*H04R 1/10* (2006.01)

(52) U.S. Cl.
CPC ....... *H04R 1/1041* (2013.01); *H04R 2420/07* (2013.01)

(58) Field of Classification Search
CPC .......................... H04R 1/1041; H04R 2420/07; H04R 1/1016; H04R 1/1025; H04R 1/1091; H04R 3/00
See application file for complete search history.

(56) References Cited

U.S. PATENT DOCUMENTS 7,406,179 B2 * 7/2008 Ryan .................... H04R 25/305 381/328
9,860,626 B2 * 1/2018 Ergezer ................ H04R 1/1041
(Continued)

FOREIGN PATENT DOCUMENTS

CN 102316394 A 1/2012
CN 105338447 A 2/2016
(Continued)

OTHER PUBLICATIONS

Chinese Office Action for Application No. 202010258894 dated Mar. 2, 2022, 13 pages.
(Continued)

*Primary Examiner* — Oyesola C Ojo

(57) ABSTRACT

This application discloses a method for determining a wearing status of a wireless earphone and a wireless earphone. The method includes: obtaining a first output of a sensor system, where the first output indicates a moving status of a housing, and determining, based on the first output, whether a body portion is put in a user's ear. This application further discloses a method for determining a double-tapped status of a wireless earphone and a wireless earphone. The method includes: obtaining a first output of a sensor system, where the first output indicates a moving status of a housing, and determining, by using a neural network model and by using the first output as a model input, whether the housing is double-tapped by an external object. This application improves accuracy of identifying the wearing status of the wireless earphone and improves accuracy of identifying the double-tapped status of the wireless earphone.

20 Claims, 12 Drawing Sheets

(56) References Cited

U.S. PATENT DOCUMENTS

| | | | | |
|---|---|---|---|---|
| 10,334,347 | B2 * | 6/2019 | Kofman | H04R 1/1016 |
| 10,491,981 | B1 * | 11/2019 | Wang | H04R 1/1041 |
| 10,812,889 | B2 * | 10/2020 | Sapozhnykov | H04R 1/1008 |
| 10,939,193 | B1 * | 3/2021 | Cao | H04R 1/1025 |
| 11,019,421 | B2 * | 5/2021 | Lee | H04R 29/001 |
| 2004/0196992 | A1 * | 10/2004 | Ryan | H04R 5/033 381/317 |
| 2006/0045304 | A1 * | 3/2006 | Lee | H04R 1/1041 381/384 |
| 2010/0020982 | A1 * | 1/2010 | Brown | H04R 1/1041 381/74 |
| 2010/0128887 | A1 * | 5/2010 | Lee | H04R 1/1041 381/74 |
| 2012/0003937 | A1 * | 1/2012 | Zhong | H04M 1/6066 455/41.3 |
| 2012/0114154 | A1 * | 5/2012 | Abrahamsson | H04R 5/033 381/309 |
| 2013/0210497 | A1 * | 8/2013 | Gerhardt | H04R 1/10 455/569.1 |
| 2013/0345842 | A1 * | 12/2013 | Karakaya | H04R 1/1041 700/94 |
| 2015/0310846 | A1 * | 10/2015 | Andersen | B05B 7/2464 381/71.6 |
| 2017/0164087 | A1 * | 6/2017 | Kurtz | H04R 1/1016 |
| 2017/0347180 | A1 * | 11/2017 | Petrank | G06F 3/165 |
| 2018/0132028 | A1 * | 5/2018 | Nakai | H04R 1/1041 |
| 2019/0052951 | A1 * | 2/2019 | Kofman | H04R 1/1041 |
| 2019/0058937 | A1 * | 2/2019 | Saulsbury | H04R 1/1041 |
| 2019/0342651 | A1 * | 11/2019 | Howell | H04R 1/1041 |
| 2020/0105268 | A1 | 4/2020 | Deng | |
| 2021/0099813 | A1 * | 4/2021 | Spieler | H04R 25/554 |
| 2021/0105565 | A1 * | 4/2021 | Pedersen | G06N 3/08 |
| 2022/0377450 | A1 * | 11/2022 | Dai | H04R 1/1091 |

FOREIGN PATENT DOCUMENTS

| | | | |
|---|---|---|---|
| CN | 106792308 | A | 5/2017 |
| CN | 107105358 | A | 8/2017 |
| CN | 107801112 | A | 3/2018 |
| CN | 107995552 | A | 5/2018 |
| CN | 108702567 | A | 10/2018 |
| CN | 108712697 | A | 10/2018 |
| CN | 108769404 | A | 11/2018 |
| CN | 108966087 | A | 12/2018 |
| CN | 110413134 | A | 11/2019 |
| CN | 110460925 | A | 11/2019 |
| CN | 110505550 | A | 11/2019 |

OTHER PUBLICATIONS

PCT International Search Report for Application No. PCT/CN2021/085300 dated Apr. 2, 2021, 15 pages.

Extended European Search Report for Application No. 21779338 dated Jul. 14, 2023, 6 pages.

* cited by examiner

METHOD FOR DETERMINING WEARING STATUS OF WIRELESS EARPHONE AND RELATED APPARATUS

CROSS-REFERENCE TO RELATED APPLICATIONS

This application is a continuation of International Application No. PCT/CN2021/085300, filed on Apr. 2, 2021, which claims priority to Chinese Patent Application No. 202010258894.X, filed on Apr. 3, 2020. The disclosures of the aforementioned applications are hereby incorporated by reference in their entireties.

TECHNICAL FIELD

This application relates to the field of wireless earphones, and in particular, to a method for determining a wearing status of a wireless earphone and a related apparatus.

BACKGROUND

A wireless earphone may communicate with a terminal device by using a wireless communications technology (for example, a Bluetooth technology, an infrared radio frequency technology, or a 2.4G wireless technology). Compared with a wired earphone, the wireless earphone is not bound by a physical cable, and is more convenient to use. Therefore, the wireless earphone develops rapidly, and left and right earphones of the wireless earphone can also be connected to the terminal device through Bluetooth.

In-ear detection is also a common interaction mode on a true wireless earphone. For example, when the earphone is removed, playing automatically stops, and when the earphone is worn, the playing resumes. Currently, the in-ear detection of the wireless earphone is basically performed through photoelectric detection, and a wearing status of a user is sensed according to an optical sensing principle. If an optical signal is blocked, it indicates that the earphone is in a wearing state, and a system automatically enters a playing mode.

However, in some complex scenarios in the conventional wearing detection technology, for example, when the earphone is in a pocket or is held by a hand, the earphone is recognized to be in the wearing state. Therefore, in the conventional technology, there is a problem of a high false detection rate.

SUMMARY

This application provides a method for determining a wearing status of a wireless earphone, where the wireless earphone includes a housing and a sensor system, and the housing has a body portion and a handle portion extending from the body portion. The method includes: obtaining a first output of the sensor system, where the first output indicates a moving status of the housing; and determining, based on the first output, whether the body portion is put in a user's ear.

It should be noted that the body portion of the wireless earphone is a portion that needs to enter an ear canal when a user wears the wireless earphone, and may include a speaker. When wearing the earphone, the user may put the body portion of the wireless earphone in the ear by holding the handle portion of the wireless earphone.

It should be noted that the first output may be data output by an acceleration sensor.

The first output is merely a basis for determining whether the body portion is put in the user's ear, and does not mean that whether the body portion is put in the user's ear is determined only based on the first output. To be specific, whether the body portion is put in the user's ear may be determined either only based on the first output, or based on the first output and data information except the first output. That is, whether the body portion is put in the user's ear is determined based on at least the first output.

In the conventional technology, the wearing status of the wireless earphone (whether the body portion is put in the user's ear) is determined based on a contact status between the wireless earphone and an external object and a blocked status between the wireless earphone and the external object. In some interference scenarios (similar to the scenario in which the body portion is put in the user's ear), for example, the wireless earphone is put in a pocket or the wireless earphone is tightly held by a hand, if the wearing status of the wireless earphone is determined only based on the contact status and the blocked status, false detection may occur. However, although the contact statuses or the blocked statuses in the interference scenarios are similar, moving statuses of the wireless earphones are greatly different. Therefore, in this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

It should be noted that, in this embodiment, it does not mean that whether the body portion is put in the user's ear can be identified accurately. Instead, in a processing result of a large amount of data, overall identification accuracy of the wearing status in this embodiment is high.

In some implementations, the determining, based on the first output, whether the body portion is put in a user's ear includes: if the first output indicates at least that the body portion has a first state, determining that the body portion is put in the user's ear, where the first state indicates that the body portion has a vibration state corresponding to a process of adjusting a position of the body portion in the ear.

Correspondingly, if the first output indicates that the body portion has no first state, it is determined that the body portion is not put in the user's ear.

The content indicated by the first output may be determined based on a pre-trained neural network model. The neural network model has a capability of processing the first output, to determine various operation statuses that are indicated by the first output and that are of the user on the earphone. After obtaining the first output, the processor may use the first output as input data of the pre-trained neural network model, perform data processing by using the neural network model, and output the content indicated by the first output. The indicated content may represent various operation statuses of the user on the earphone, and the operation statuses may include that the body portion is put in the user's ear.

It should be noted that, in some implementations, if the first output indicates that the body portion has the first state, it is determined that the body portion is put in the user's ear. In other implementations, only if the first output indicates that the body portion has the first state and another state, it can be determined that the body portion is put in the user's ear.

It should be noted that if the first output indicates that the body portion has the first state, it means that the first output indicates that the body portion is in the first state or the first output indicates that the body portion has a plurality of states, and the first state is one of the plurality of states. For example, the first output may indicate that the body portion changes from another state to the first state, or changes from the first state to another state.

It should be noted that, in a process in which the user wears the wireless earphone, the user may hold the handle portion of the wireless earphone, and put the body portion in the ear. In this process, after the body portion is in contact with the ear, the user needs to adjust a position of the body portion in the ear, so that the body portion is in a correct position in the ear (in this position, a sound outlet hole of the speaker of the body portion faces an ear hole of the user, and enhance user comfort, and when the body portion is in this position, the user can clearly hear sound from the speaker). In the process of adjusting the position of the body portion of the earphone in the ear, the body portion vibrates (with floating displacement) to some extent, and the vibration state may be obtained by the acceleration sensor of the sensor system. Correspondingly, a first output may indicate the vibration state.

In this embodiment, in some interference scenarios (similar to the scenario in which the body portion is put in the user's ear), for example, the wireless earphone is put in a pocket or the wireless earphone is tightly held by a hand, although a blocked status and a contact status of the earphone are similar to those when the earphone is worn, a moving status of the earphone is greatly different from that when the earphone is worn. In this embodiment, whether the body portion has the vibration status corresponding to the process of adjusting the position of the body portion in the ear is determined as a basis for determining whether the wireless earphone is put in the user's ear, so that the wearing status of the wireless earphone is better distinguished from the foregoing interference scenarios, to accurately analyze the wearing status of the wireless earphone. This can improve accuracy of identifying the wearing status of the wireless earphone.

In some implementations, the first state indicates that the body portion changes from a moving state of moving to the ear to the vibration state corresponding to the process of adjusting the position of the body portion in the ear.

It should be noted that, in a process in which the user wears the wireless earphone, the user may hold the handle portion of the wireless earphone, and put the body portion in the ear. In this process, the body portion first has the moving state of displacement to the human ear, then enters the human ear, and has the vibration state corresponding to the process of adjusting the position of the body portion in the ear. The moving state may also be captured by the acceleration sensor. Correspondingly it may also be determined, by parsing the first output that is output by the acceleration sensor, that the body portion has the moving state of moving to the ear.

In this embodiment, whether the body portion changes from the moving state of moving to the ear to the vibration state corresponding to the process of adjusting the position of the body portion in the ear is used as a basis for determining whether the body portion is put in the user's ear, so that the wearing status of the wireless earphone can be better distinguished from the foregoing interference scenarios, to accurately analyze the wearing status of the wireless earphone. This can improve accuracy of identifying the wearing status of the wireless earphone.

In some implementations, the determining, based on the first output, whether the body portion is put in a user's ear includes: if the first output indicates at least that a vibration amplitude of the body portion is within a first preset range and a vibration frequency of the body portion is within a second preset range, determining that the body portion is put in the user's ear.

It should be noted that, in some implementations, the first output may be detected according to some detection algorithms, and mathematical features of the first output may be parsed. The mathematical features may include a vibration amplitude and a vibration frequency. When the vibration amplitude and the vibration frequency meet specific conditions, it is determined that the body portion is put in the user's ear.

It should be noted that the first preset range and the second preset range may be determined based on a characteristic of the moving status in the process in which the body portion is put in the user's ear. This is not limited herein.

In some implementations, the determining, based on the first output, whether the body portion is put in a user's ear includes: determining, by using a neural network model and by using at least the first output as a model input, whether the body portion is put in the user's ear.

It should be noted that the model input of the neural network model may include the first output or other data. For a technical solution implemented by using the neural network model, when the neural network model is trained, a large amount of acceleration data corresponding to the vibration state corresponding to the process of adjusting the position of the body portion in the ear may be used as a training sample, and the neural network model is trained, so that the neural network model can learn of a capability of identifying that the output of the sensor system at least indicates that the body portion has the first state.

In this embodiment, whether the body portion is put in the user's ear is determined based on the pre-trained neural network model. Because the neural network model can learn of more content than a common data processing algorithm, the neural network model has a better capability of distinguishing the wearing status of the wireless earphone from another interference scenario. This can improve accuracy of identifying the wearing status of the wireless earphone.

It should be noted that the neural network model in this embodiment may be deployed on a server on a cloud side or deployed on an earphone side (all neural network models in the following embodiments each may also be deployed on a server on a cloud side or deployed on an earphone side).

If the neural network model is deployed on the server, after obtaining output data of the sensor system, an earphone sensor may send the output data to the server, so that the server processes the obtained output data by using the neural network model, obtains an identification result of the wearing status of the wireless earphone, and sends the identification result to the earphone side.

If the neural network model is deployed on the earphone side, after obtaining output data of the sensor system, an earphone sensor may process the obtained output data by using the neural network model, and obtain an identification result of the wearing status of the wireless earphone. The neural network model may be trained by the server side and sent to the earphone side.

In some implementations, the method further includes: obtaining a second output of the sensor system, where the second output indicates a blocked status of the body portion, and correspondingly, the determining, based on the first output, whether the body portion is put in a user's ear includes: determining, based on the first output and the second output, whether the body portion is put in the user's ear.

In this embodiment, in some scenarios, both the second output that indicates the blocked status of the body portion and the first output that indicates the moving status of the housing are used as bases for determining whether the body portion is put in the user's ear. In some scenarios, there is an interference scenario similar to the moving status of the housing in the process in which the body portion is put in the user's ear (for example, when the earphone is located on some objects with small amplitude and fast frequency vibrations). With reference to the blocked status, a capability of distinguishing the real wearing status of the wireless earphone from the foregoing interference scenarios can be learned. This can improve accuracy of identifying the wearing status of the wireless earphone.

In some implementations, the second state indicates that the body portion has a blocked state in which the body portion is blocked by the ear.

In a process of wearing the wireless earphone, the user may hold the handle portion of the wireless earphone, and put the body portion in the ear. In this case, an optical proximity sensor located in the body portion may detect that the body portion of the wireless earphone is blocked, it may be determined, by parsing the second output of the optical proximity sensor, that the body portion has the blocked state in which the body portion is blocked by the ear.

In this embodiment, that the wireless earphone is worn is not determined by only determining whether the body portion is blocked, but that the wireless earphone is worn is determined only when it is determined that the body portion is blocked by the ear. In this embodiment, the wearing status of the wireless earphone can be better distinguished from another interference scenario (for example, blocked by another obstacle such as clothes), to accurately analyze the wearing status of the wireless earphone. This can improve accuracy of identifying the wearing status of the wireless earphone.

The foregoing may be implemented based on the neural network model. The neural network model is trained, so that the neural network model has a capability of distinguishing between the blocked state in which the earphone is blocked by the ear and another blocked state (for example, blocked by another obstacle such as clothes). Further, the second output is processed by using the pre-trained neural network model, to determine that the body portion has the blocked state in which the earphone is blocked by the ear.

In some implementations, the second state indicates that the body portion changes from an unblocked state to the blocked state in which the body portion is blocked by the ear.

In a process of wearing the wireless earphone, the user may hold the handle portion of the wireless earphone. In this case, the body portion is in the unblocked state. After the body portion is put in the ear, the body portion is in the blocked state in which the body portion is blocked by the ear. In this case, the optical proximity sensor located in the body portion may detect change in the blocked state of the body portion of the wireless earphone, it may be determined, by parsing the second output of the optical proximity sensor, that the body portion changes from the unblocked state to the blocked state in which the body portion is blocked by the ear.

In this embodiment, the change in the blocked state of the body portion is used as a basis for determining the wearing status of the wireless earphone, so that the wearing status of the wireless earphone can be better distinguished from another interference scenario (for example, a similar scenario in which the wireless earphone is blocked by the ear), to accurately analyze the wearing status of the wireless earphone. This can improve accuracy of identifying the wearing status of the wireless earphone.

In some implementations, the second state indicates that a blocked state in which the handle portion is blocked by a hand is changed to the blocked state in which the body portion is blocked by the ear.

In a process of wearing the wireless earphone, the user may hold the handle portion of the wireless earphone. In this case, the handle portion is in the blocked state in which the handle portion is blocked by the hand. After the body portion is put in the ear, the body portion is in the blocked state in which the body portion is blocked by the ear. Correspondingly, the optical proximity sensor located in the handle portion and the body portion may detect that the wireless earphone changes from the blocked state in which the handle portion is blocked by the hand to the blocked state in which the body portion is blocked by the ear, and may determine, by parsing the second output of the optical proximity sensor, that the blocked state in which the handle portion is blocked by the hand to the blocked state in which the body portion is blocked by the ear.

In this embodiment, the change in the blocked state of the handle portion and the blocked state of the body portion is used as a basis for determining the wearing status of the wireless earphone, so that the wearing status of the wireless earphone can be better distinguished from another interference scenario, to accurately analyze the wearing status of the wireless earphone. This can improve accuracy of identifying the wearing status of the wireless earphone.

In some implementations, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In this embodiment of this application, when the user normally wears the wireless earphone, if light leaks into the ear because the earphone is loose in the ear, and when the body portion remains blocked by the ear, the value of the second output is greater than the first threshold, in this scenario, it may still be considered that the wireless earphone is in a state in which the wireless earphone is put in the ear. This embodiment can further improve accuracy of identifying the wearing status of the wireless earphone.

In some implementations, the determining, based on the first output and the second output, whether the body portion is put in the user's ear includes: determining, by using a neural network model and by using at least the first output and the second output as model inputs, whether the body portion is put in the user's ear.

It should be noted that the model input of the neural network model may include the first output or other data. For a technical solution implemented by using the neural network model, when the neural network model is trained, a large amount of acceleration data corresponding to the vibration state corresponding to the process of adjusting the position of the body portion in the ear and optical proximity data that represents the blocked status of the wireless earphone may be used as training samples, and the neural network model is trained, so that the neural network model can learn of a capability of identifying that the output of the sensor system at least indicates that the body portion has the first state and the second state.

In this embodiment, whether the body portion is put in the user's ear is determined based on the pre-trained neural network model. Because the neural network model can learn of more content than a common data processing algorithm, the neural network model has a better capability of distinguishing the wearing status of the wireless earphone from another interference scenario. This can improve accuracy of identifying the wearing status of the wireless earphone.

In some implementations, the method further includes: obtaining a third output of the sensor system, where the third output indicates a contact status of the body portion, and correspondingly, the determining, based on the first output, whether the body portion is put in a user's ear includes: determining, based on the first output and the third output, whether the body portion is put in the user's ear.

In this embodiment, in some scenarios, both the third output that indicates the contact status of the body portion and the first output that indicates the moving status of the housing are used as bases for determining whether the body portion is put in the user's ear. In some scenarios, there is an interference scenario similar to the moving status of the housing in the process in which the body portion is put in the user's ear (for example, when the earphone is suspended and some slight vibrations occur). A capability of distinguishing the real wearing status of the wireless earphone from the foregoing interference scenarios can be learned based on the contact status. This can improve accuracy of identifying the wearing status of the wireless earphone.

In some implementations, the determining, based on the first output and the third output, whether the body portion is put in the user's ear includes: if the first output indicates that the body portion has a first state, and the third output indicates at least that the body portion has a third state, determining that the body portion is put in the user's ear, where the first state indicates that the body portion has a vibration state corresponding to a process of adjusting a position of the body portion in the ear, and the third state indicates that the body portion has a contact state.

In some implementations, the third state indicates that the body portion has a contact state in which the body portion is in contact with the ear.

In a process of wearing the wireless earphone, the user may hold the handle portion of the wireless earphone, and put the body portion in the ear. In this case, a capacitance sensor located in the body portion may detect that the body portion of the wireless earphone is in contact with the ear, it may be determined, by parsing the third output of the capacitance sensor, that the body portion has the contact state in which the body portion is in contact with the ear.

In this embodiment, that the wireless earphone is worn is not determined by only determining whether the body portion is in contact with the external object, but that the wireless earphone is worn is determined only when it is determined that the body portion is in contact with the external object. In this embodiment, the wearing status of the wireless earphone can be better distinguished from another interference scenario (for example, in contact with another obstacle such as clothes), to accurately analyze the wearing status of the wireless earphone. This can improve accuracy of identifying the wearing status of the wireless earphone.

The foregoing may be implemented based on the neural network model. The neural network model is trained, so that the neural network model has a capability of distinguishing between the contact state in which the earphone is in contact with the ear and another contact state (for example, in contact with another obstacle such as clothes). Further, the third output is processed by using the pre-trained neural network model, to determine that the body portion has the contact state in which the body portion is in contact with the ear.

In some implementations, the third state indicates that the body portion changes from a non-contact state to the contact state in which the body portion is in contact with the ear.

In a process of wearing the wireless earphone, the user may hold the handle portion of the wireless earphone. In this case, the body portion is in the non-contact state. After the body portion is put in the ear, the body portion is in the contact state in which the body portion is in contact with the ear. In this case, the capacitance sensor located in the body portion may detect the change in the contact state of the body portion of the wireless earphone, it may be determined, by parsing the third output of the capacitance sensor, that the body portion changes from the non-contact state to the contact state in which the body portion is in contact with the ear.

In this embodiment, the change in the contact state of the body portion is used as a basis for determining the wearing status of the wireless earphone, so that the wearing status of the wireless earphone can be better distinguished from another interference scenario (for example, a similar scenario in which the wireless earphone is in the contact state in which the body portion is in contact with the ear), to accurately analyze the wearing status of the wireless earphone. This can improve accuracy of identifying the wearing status of the wireless earphone.

In some implementations, the third state indicates that a contact state in which the handle portion is in contact with a hand is changed to the contact state in which the body portion is in contact with the ear.

In a process of wearing the wireless earphone, the user may hold the handle portion of the wireless earphone. In this case, the handle portion is in the contact state in which the handle portion is in contact with the hand. After the body portion is put in the ear, the body portion is in the contact state in which the body portion is contact with the ear. Correspondingly, the capacitance sensor located in the handle portion and the body portion may detect that the wireless earphone changes from the contact state in which the handle portion is in contact with the hand to the contact state in which the body portion is in contact with the ear, and may determine, by parsing the third output of the capacitance sensor, that the contact state in which the handle portion is in contact with the hand to the contact state in which the body portion is in contact with the ear.

In this embodiment, the change in the contact state of the handle portion and the body portion is used as a basis for determining the wearing status of the wireless earphone, so that the wearing status of the wireless earphone can be better distinguished from another interference scenario, to accurately analyze the wearing status of the wireless earphone. This can improve accuracy of identifying the wearing status of the wireless earphone.

In some implementations, the determining, based on the first output and the third output, whether the body portion is put in the user's ear includes: determining, by using a neural network model and by using at least the first output and the third output as model inputs, whether the body portion is put in the user's ear.

Specifically, if the neural network model is deployed on the server, the system including the wireless earphone and the server in this embodiment of this application may further perform the following steps:

the wireless earphone obtains a first output of the sensor system of the wireless earphone, where the first output indicates a moving status of the housing;

the wireless earphone sends the first output to the server;

the server determines, based on the first output, whether the body portion is put in a user's ear; and the server sends a determining result to the wireless earphone.

It should be noted that the determining result may indicate whether the body portion is put in the user's ear. For example, the determining result may be a character string.

In an implementation, that the server determines, based on the first output, whether the body portion is put in a user's ear includes:

if the first output indicates at least that the body portion has a first state, the server determines that the body portion is put in the user's ear; where the first state indicates that the body portion has a vibration state corresponding to a process of adjusting a position of the body portion in the ear.

In an implementation, the first state indicates that the body portion changes from a moving state of moving to the ear to the vibration state corresponding to the process of adjusting the position of the body portion in the ear.

In an implementation, that the server determines, based on the first output, whether the body portion is put in a user's ear includes:

if the first output indicates at least that a vibration amplitude of the body portion is within a first preset range and a vibration frequency of the body portion is within a second preset range, the server determines that the body portion is put in the user's ear.

In an implementation, that the server determines, based on the first output, whether the body portion is put in a user's ear includes:

the server determines, by using a neural network model and by using at least the first output as a model input, whether the body portion is put in the user's ear.

In an implementation, the method further includes:

the wireless earphone obtains a second output of the sensor system, where the second output indicates a blocked status of the body portion; and the method includes:

the wireless earphone sends the second output to the server; and correspondingly, that the server determines, based on the first output, whether the body portion is put in a user's ear includes:

the server determines, based on the first output and the second output, whether the body portion is put in the user's ear.

In an implementation, that the server determines, based on the first output and the second output, whether the body portion is put in the user's ear includes:

if the first output indicates that the body portion has a first state, and the second output indicates at least that the body portion has a second state, the server determines that the body portion is put in the user's ear; where the first state indicates that the body portion has a vibration state corresponding to a process of adjusting a position of the body portion in the ear, and the second state indicates that the body portion has a blocked state.

In an implementation, the second state indicates that the body portion has a blocked state in which the body portion is blocked by the ear.

In an implementation, the second state indicates that the body portion changes from an unblocked state to the blocked state in which the body portion is blocked by the ear.

In an implementation, the second state indicates that a blocked state in which the handle portion is blocked by a hand is changed to the blocked state in which the body portion is blocked by the ear.

In an implementation, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In an implementation, that the server determines, based on the first output and the second output, whether the body portion is put in the user's ear includes:

the server determines, by using a neural network model and by using at least the first output and the second output as model inputs, whether the body portion is put in the user's ear.

In an implementation, the method further includes:

the wireless earphone obtains a third output of the sensor system, where the third output indicates a contact status of the body portion, and the method includes:

the wireless earphone sends the third output to the server; and correspondingly, that the server determines, based on the first output, whether the body portion is put in a user's ear includes:

the server determines, based on the first output and the third output, whether the body portion is put in the user's ear.

In an implementation, that the server determines, based on the first output and the third output, whether the body portion is put in the user's ear includes:

if the first output indicates that the body portion has a first state, and the third output indicates that the body portion has a third state, the server determines that the body portion is put in the user's ear; where the first state indicates that the body portion has a vibration state corresponding to a process of adjusting a position of the body portion in the ear, and the third state indicates that the body portion has a contact state.

In an implementation, the third state indicates that the body portion has a contact state in which the body portion is in contact with the ear.

In an implementation, the third state indicates that the body portion changes from a non-contact state to the contact state in which the body portion is in contact with the ear.

In an implementation, the third state indicates that a contact state in which the handle portion is in contact with a hand is changed to the contact state in which the body portion is in contact with the ear.

In an implementation, that the server determines, based on the first output and the third output, whether the body portion is put in the user's ear includes:

the server determines, by using a neural network model and by using at least the first output and the third output as model inputs, whether the body portion is put in the user's ear.

According to a second aspect, this application provides a method for determining a double-tap status of a wireless earphone, where the wireless earphone includes a housing and a sensor system, and the method includes: obtaining a first output of the sensor system, where the first output indicates a moving status of the housing; and determining, by using a neural network model and by using the first output as a model input, whether the housing is double-tapped by an external object.

It should be noted that the model input of the neural network model may include the first output or other data. When the neural network model is trained, a large amount of acceleration data corresponding to the double-tapping on the housing of the wireless earphone from the external object may be used as a training sample, and the neural network model is trained, so that the neural network model can learn of a capability of identifying whether the output housing of the sensor system is double-tapped by the external object.

In this embodiment, whether the housing is double-tapped by the external object is determined based on the pre-trained neural network model. Because the neural network model can learn of more content than a common data processing algorithm, the neural network model has a better capability of distinguishing the double-tap status of the wireless earphone from another interference scenario. This can improve accuracy of identifying the double-tap status of the wireless earphone.

In some implementations, the determining, by using a neural network model and by using the first output as a model input, whether the housing is double-tapped by an external object includes: if it is determined that a data peak of the first output is greater than a second threshold, data energy of the first output is greater than a third threshold, and the first output includes two or more wave crests, determining, by using the neural network model and by using the third output as the model input, whether the housing is double-tapped by the external object.

In this embodiment, a hierarchical detection solution is used. First, mathematical features (a peak, data energy, a quantity of wave crests, and the like) of data output by the acceleration sensor are detected by using a common algorithm (computing power overheads of the algorithm may be small). Determining of the foregoing data features may be completed without using an algorithm with large computing power overheads or a neural network. Initial screening in the first step is completed by determining whether the determined mathematical features meet conditions corresponding to the double-tapping. Only the data, output by the acceleration sensor, meeting the condition enters the neural network model (the computing power overheads are large), to detect the double-tap status of the wireless earphone.

Specifically, the wearing status of the wireless earphone is detected by using the neural network model only when the data peak of the first output is greater than the second threshold, the data energy of the first output is greater than the third threshold, and the first output includes the two or more wave crests. In this embodiment, neural network model identification does not run all the time, greatly reducing power consumption of the earphone.

Specifically, if the neural network model is deployed on the server, the system including the wireless earphone and the server in this embodiment of this application may further perform the following steps:

- the wireless earphone obtains a first output of the sensor system of the wireless earphone, where the first output indicates a moving status of the housing;
- the wireless earphone sends the first output to the server;
- the server determines, by using a neural network model and by using the first output as a model input, whether the housing is double-tapped by an external object; and
- the server sends a determining result to the wireless earphone.

It should be noted that the determining result may indicate whether the housing is double-tapped by the external object. For example, the determining result may be a character string.

Optionally, that the server determines, by using a neural network model and by using the first output as a model input, whether the housing is double-tapped by an external object includes: if the server determines that a data peak of the first output is greater than a second threshold, data energy of the first output is greater than a third threshold, and the first output includes two or more wave crests, the server determines, by using the neural network model and by using the third output as the model input, whether the housing is double-tapped by the external object.

According to a third aspect, this application provides a wireless earphone, where the wireless earphone includes a housing, a sensor system, and a processor, the sensor system is connected to the processor, and the housing has a body portion and a handle portion extending from the body portion.

The processor is configured to obtain a first output of the sensor system, where the first output indicates a moving status of the housing, and determine, based on the first output, whether the body portion is put in a user's ear.

In some implementation, the processor is specifically configured to: if the first output indicates at least that the body portion has a first state, determine that the body portion is put in the user's ear; where the first state indicates that the body portion has a vibration state corresponding to a process of adjusting a position of the body portion in the ear.

In some implementations, the first state indicates that the body portion changes from a moving state of moving to the ear to the vibration state corresponding to the process of adjusting the position of the body portion in the ear.

In some implementation, the processor is specifically configured to: if the first output indicates at least that a vibration amplitude of the body portion is within a first preset range and a vibration frequency of the body portion is within a second preset range, determine that the body portion is put in the user's ear.

In some implementations, the processor is specifically configured to determine, by using a neural network model and by using at least the first output as a model input, whether the body portion is put in the user's ear.

In some implementation, the processor is further configured to obtain a second output of the sensor system, where the second output indicates a blocked status of the body portion, and determine, based on the first output and the second output, whether the body portion is put in the user's ear.

In some implementation, the processor is specifically configured to: if the first output indicates that the body portion has a first state, and the second output indicates at least that the body portion has a second state, determine that the body portion is put in the user's ear; where the first state indicates that the body portion has a vibration state corresponding to a process of adjusting a position of the body portion in the ear, and the second state indicates that the body portion has a blocked state.

In some implementations, the second state indicates that the body portion has a blocked state in which the body portion is blocked by the ear.

In some implementations, the second state indicates that the body portion changes from an unblocked state to the blocked state in which the body portion is blocked by the ear.

In some implementations, the second state indicates that a blocked state in which the handle portion is blocked by a hand is changed to the blocked state in which the body portion is blocked by the ear.

In some implementations, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In some implementations, the processor is specifically configured to determine, by using a neural network model and by using at least the first output and the second output as model inputs, whether the body portion is put in the user's ear.

In some implementation, the processor is further configured to obtain a third output of the sensor system, where the third output indicates a contact status of the body portion, and determine, based on the first output and the third output, whether the body portion is put in the user's ear.

In some implementation, the processor is specifically configured to: if the first output indicates that the body portion has a first state, and the third output indicates at least that the body portion has a third state, determine that the body portion is put in the user's ear; where the first state indicates that the body portion has a vibration state corresponding to a process of adjusting a position of the body portion in the ear, and the third state indicates that the body portion is in a contact state.

In some implementations, the third state indicates that the body portion has a contact state in which the body portion is in contact with the ear.

In some implementations, the third state indicates that the body portion changes from a non-contact state to the contact state in which the body portion is in contact with the ear.

In some implementations, the third state indicates that a contact state in which the handle portion is in contact with a hand is changed to the contact state in which the body portion is in contact with the ear.

In some implementations, the processor is specifically configured to determine, by using a neural network model and by using at least the first output and the third output as model inputs, whether the body portion is put in the user's ear.

According to a fourth aspect, this application provides a wireless earphone, where the wireless earphone includes a housing, a sensor system, and a processor; and the processor is configured to obtain a first output of the sensor system, where the first output indicates a moving status of the housing, and determine, by using a neural network model and by using the first output as a model input, whether the housing is double-tapped by an external object.

In some implementations, the processor is specifically configured to: if it is determined, with in a first preset time period, that a data peak of the first output is greater than a second threshold, data energy of the first output is greater than a third threshold, and the first output includes two or more wave crests, determine, by using the neural network model and by using the third output as the model input, whether the housing is double-tapped by the external object.

According to a fifth aspect, this application provides an apparatus for determining a wearing status of a wireless earphone, where the wireless earphone includes a housing and a sensor system, the housing has a body portion and a handle portion extending from the body portion, and the apparatus includes:

an obtaining module, configured to obtain a first output of the sensor system, where the first output indicates a moving status of the housing; and a determining module, configured to determine, based on the first output, whether the body portion is put in a user's ear.

In some implementations, the determining module is specifically configured to:

if the first output indicates at least that the body portion has a vibration state corresponding to a process of adjusting a position of the body portion in the ear, determine that the body portion is put in the user's ear; where the first state indicates that the body portion has a vibration state corresponding to a process of adjusting a position of the body portion in the ear.

In some implementations, the first state indicates that the body portion changes from a moving state of moving to the ear to the vibration state corresponding to the process of adjusting the position of the body portion in the ear.

In some implementations, the determining module is specifically configured to:

if the first output indicates at least that a vibration amplitude of the body portion is within a first preset range and a vibration frequency of the body portion is within a second preset range, determine that the body portion is put in the user's ear.

In some implementations, the determining module is specifically configured to:

determine, by using a neural network model and by using at least the first output as a model input, whether the body portion is put in the user's ear.

In some implementations, the obtaining module is configured to obtain a second output of the sensor system, where the second output indicates a blocked status of the body portion, and correspondingly, the determining module is configured to determine, based on the first output and the second output, whether the body portion is put in the user's ear.

In some implementations, the determining module is specifically configured to:

if the first output indicates that the body portion has a first state, and the second output indicates at least that the body portion has a second state, determine that the body portion is put in the user's ear; where the first state indicates that the body portion has a vibration state corresponding to a process of adjusting a position of the body portion in the ear, and the second state indicates that the body portion has a blocked state.

In some implementations, the second state indicates that the body portion has a blocked state in which the body portion is blocked by the ear.

In some implementations, the second state indicates that the body portion changes from an unblocked state to the blocked state in which the body portion is blocked by the ear.

In some implementations, the second state indicates that a blocked state in which the handle portion is blocked by a hand is changed to the blocked state in which the body portion is blocked by the ear.

In some implementations, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In some implementations, the determining module is specifically configured to:

determine, by using a neural network model and by using at least the first output and the second output as model inputs, whether the body portion is put in the user's ear.

In some implementations, the obtaining module is specifically configured to:

obtain a third output of the sensor system, where the third output indicates a contact status of the body portion, and correspondingly, the determining, based on the first output, whether the body portion is put in a user's ear includes:

the determining module is specifically configured to:

determine, based on the first output and the third output, whether the body portion is put in the user's ear.

In some implementations, the determining module is specifically configured to:

if the first output indicates that the body portion has a first state, and the third output indicates that the body portion has a third state, determine that the body portion is put in the user's ear; where the first state indicates that the body portion has a vibration state corresponding to a process of adjusting a position of the body portion in the ear, and the third state indicates that the body portion is in a contact state.

In some implementations, the third state indicates that the body portion has a contact state in which the body portion is in contact with the ear.

In some implementations, the third state indicates that the body portion changes from a non-contact state to the contact state in which the body portion is in contact with the ear.

In some implementations, the third state indicates that a contact state in which the handle portion is in contact with a hand is changed to the contact state in which the body portion is in contact with the ear.

In some implementations, the determining module is specifically configured to:

determine, by using a neural network model and by using at least the first output and the third output as model inputs, whether the body portion is put in the user's ear.

According to a sixth aspect, this application provides an apparatus for determining a double-tap status of a wireless earphone, where the wireless earphone includes a housing and a sensor system, and the apparatus includes:

an obtaining module, configured to obtain a first output of the sensor system, where the first output indicates a moving status of the housing; and a determining module, configured to determine, by using a neural network model and by using the first output as a model input, whether the housing is double-tapped by an external object.

In some implementations, the determining module is specifically configured to:

if it is determined that a data peak of the first output is greater than a second threshold, data energy of the first output is greater than a third threshold, and the first output includes two or more wave crests, determine, by using the neural network model and by using the third output as the model input, whether the housing is double-tapped by the external object.

According to a seventh aspect, an embodiment of this application provides a method for determining a wearing status of a wireless earphone, where the wireless earphone includes a housing and a sensor system, the housing has a body portion and a handle portion extending from the body portion, and the method includes:

obtaining a first output of the sensor system, where the first output indicates a moving status of the housing; and if it is determined that the first output indicates that a vibration amplitude of the housing is within a first preset range and a vibration frequency of the housing is within a second preset range, determining, by using a neural network model, that the body portion is put in the user's ear.

In this embodiment, a hierarchical detection solution is used. First, mathematical features (the vibration amplitude and the vibration frequency) of data output by the acceleration sensor are detected by using a common algorithm (computing power overheads of the algorithm may be small). Determining of the foregoing data features may be completed without using an algorithm with large computing power overheads or a neural network. Initial screening in the first step is completed by determining whether the determined mathematical features meet conditions corresponding to that the body portion is put in the user's ear (the vibration amplitude of the housing is within the first preset range and the vibration frequency of the housing is within the second preset range). Only data, output by the acceleration sensor, meeting the condition enters the neural network model (the computing power overheads are large), to detect the wearing status of the wireless earphone.

Specifically, the wearing status of the wireless earphone is detected by using the neural network model only when the vibration amplitude of the housing is within the first preset range and the vibration frequency of the housing is within the second preset range. Neural network model identification does not run all the time, greatly reducing power consumption of the earphone.

In some implementations, the sensor system includes an optical proximity sensor, the optical proximity sensor is configured to output the second output, the second output represents a magnitude of light energy received by the optical proximity sensor, and the method includes:

obtaining the second output of the optical proximity sensor; and correspondingly, that if it is determined that the first output indicates that a vibration amplitude of the housing is within a first preset range and a vibration frequency of the housing is within a second preset range includes:

if it is determined that the first output indicates that the vibration amplitude of the housing is within the first preset range and the vibration frequency of the housing is within the second preset range, and that the second output indicates that the magnitude of light energy received by the optical proximity sensor is within a third preset range, determining, by using a neural network model, that the body portion is put in the user's ear.

In this embodiment, the wearing status of the wireless earphone is detected by using the neural network model only when the vibration amplitude of the housing is within the first preset range and the vibration frequency of the housing is within the second preset range, and when the second output indicates that the magnitude of light energy received by the optical proximity sensor is within the third preset range. Neural network model identification does not run all the time, further reducing power consumption of the earphone.

In some implementations, the sensor system includes a capacitance sensor, the capacitance sensor is configured to output a third output, and the method includes:

obtaining the third output of the capacitance sensor; and correspondingly, that if it is determined that the first output indicates that a vibration amplitude of the housing is within a first preset range and a vibration frequency of the housing is within a second preset range includes:

if it is determined that the first output indicates that the vibration amplitude of the housing is within the first preset range, the vibration frequency of the housing is within the second preset range, and the third output is within a third preset range, determining, by using a neural network model, that the body portion is put in the user's ear.

In this embodiment, the wearing status of the wireless earphone is detected by using the neural network model only when the vibration amplitude of the housing is within the first preset range, the vibration frequency of the housing is within the second preset range, and the third output is within the third preset range. Neural network model identification does not run all the time, further reducing power consumption of the earphone.

According to an eighth aspect, an embodiment of this application provides an apparatus for determining a wearing status of a wireless earphone, where the wireless earphone includes a housing and a sensor system, the housing has a body portion and a handle portion extending from the body portion, and the apparatus includes:

an obtaining module, configured to obtain a first output of the sensor system, where the first output indicates a moving status of the housing; and a determining module, configured to: if it is determined that the first output indicates that a vibration amplitude of the housing is within a first preset range and a vibration frequency of the housing is within a second preset range, determine, by using a neural network model, that the body portion is put in the user's ear.

In some implementations, the sensor system includes an optical proximity sensor, the optical proximity sensor is configured to output the second output, the second output represents a magnitude of light energy received by the optical proximity sensor, and the obtaining module is configured to:

obtain the second output of the optical proximity sensor; and correspondingly, the determining module is configured to:

if it is determined that the first output indicates that the vibration amplitude of the housing is within the first preset range and the vibration frequency of the housing is within the second preset range, and that the second output indicates that the magnitude of light energy received by the optical proximity sensor is within a third preset range, determine, by using a neural network model, that the body portion is put in the user's ear.

In some implementations, the sensor system includes a capacitance sensor, the capacitance sensor is configured to output a third output, and the obtaining module is configured to:

obtain the third output of the capacitance sensor; and correspondingly, the determining module is configured to:

if it is determined that the first output indicates that the vibration amplitude of the housing is within the first preset range, the vibration frequency of the housing is within the second preset range, and the third output is within a third preset range, determine, by using a neural network model, that the body portion is put in the user's ear.

According to a ninth aspect, an embodiment of this application provides a computer-readable storage medium. The computer-readable storage medium stores a computer program; and when the computer program is run on a computer, the computer is enabled to perform any method for determining the wearing status of the wireless earphone according to the first aspect.

According to a tenth aspect, an embodiment of this application provides a computer-readable storage medium. The computer-readable storage medium stores a computer program; and when the computer program is run on a computer, the computer is enabled to perform any method for determining the double-tap status of the wireless earphone according to the second aspect.

According to an eleventh aspect, an embodiment of this application provides a computer-readable storage medium. The computer-readable storage medium stores a computer program; and when the computer program is run on a computer, the computer is enabled to perform any method for determining the wearing status of the wireless earphone according to the seventh aspect.

According to a twelfth aspect, an embodiment of this application provides a computer program; and when the computer program is run on a computer, the computer is enabled to perform any method for determining the wearing status of the wireless earphone according to the first aspect.

According to a thirteenth aspect, an embodiment of this application provides a computer program; and when the computer program is run on a computer, the computer is enabled to perform any method for determining the double-tap status of the wireless earphone according to the second aspect.

According to a thirteenth aspect, an embodiment of this application provides a computer program; and when the computer program is run on a computer, the computer is enabled to perform any method for determining the wearing status of the wireless earphone according to the seventh aspect.

According to a fourteenth aspect, this application provides a chip system. The chip system includes a processor, configured to support an execution device or a training device to implement functions in the foregoing aspects, for example, sending or processing data and/or information in the foregoing method. In a possible design, the chip system further includes a memory, and the memory is configured to store program instructions and data that are necessary for the execution device or the training device. The chip system may include a chip, or may include a chip and another discrete component.

In this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

DETAILED DESCRIPTION OF EXAMPLE EMBODIMENTS

The following describes embodiments of the present application with reference to the accompanying drawings in embodiments of the present application. Terms used in an implementation part of the present application are intended only to explain specific embodiments of the present application, and not intended to limit the present application.

The following describes embodiments of this application with reference to the accompanying drawings. A person of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
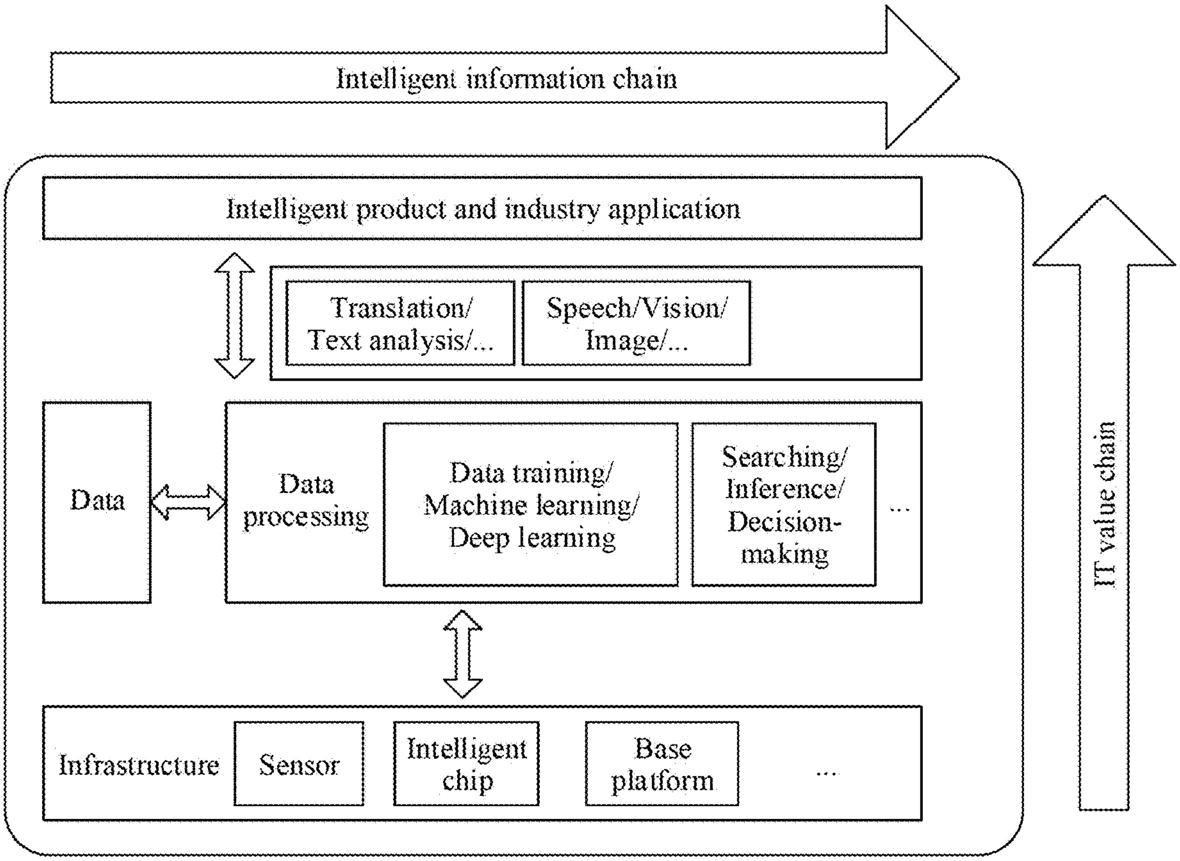
FIG. 1 is a schematic diagram of a structure of an artificial intelligence main framework.

An overall working procedure of an artificial intelligence system is first described. FIG. 1 is a schematic diagram of a structure of an artificial intelligence main framework. The following describes the foregoing artificial intelligence theme framework from two dimensions: "intelligent information chain" (horizontal axis) and "IT value chain" (vertical axis). The "intelligent information chain" reflects a general process from data obtaining to data processing. For example, the process may be a general process of intelligent information perception, intelligent information representation and formation, intelligent inference, intelligent decision-making, and intelligent execution and output. In this process, data undergoes a condensation process of "data-information-knowledge-wisdom". The "IT value chain" reflects a value brought by artificial intelligence to the information technology industry from an underlying infrastructure and information (providing and processing technology implementation) of human intelligence to an industrial ecological process of a system.

(1) Infrastructure

The infrastructure provides computing capability support for the artificial intelligence system, implements communication with the external world, and implements support by using a base platform. A sensor is configured to communicate with the outside. A computing capability is provided by an intelligent chip (a hardware acceleration chip, for example, a CPU, an NPU, a GPU, an ASIC, or an FPGA). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure is used to indicate a data source in the field of artificial intelligence. The data relates to a graph, an image, a voice, and text, further relates to internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, such as translation, text analysis, computer vision processing, speech recognition, and image recognition.

(5) Intelligent Product and Industry Application

Intelligent products and industry applications refer to products and applications of the artificial intelligence system in various fields, and are package of an overall solution of artificial intelligence. Decision making for intelligent information is productized and an application is implemented. Application fields mainly include an intelligent portable device, and the like.

Because embodiments of this application relate to massive application of a neural network, for ease of understanding, the following describes terms and concepts related to the neural network that may be used in the embodiments of this application.

(1) Neural Network

The neural network may include a neuron. The neuron may be an operation unit that uses $X_s$ and an intercept of 1 as an input. An output of the operation unit may be as follows:

$$h_{w,b}(x)=f(W^Tx)=f(\Sigma_{s=1}^{n} W_s x_s+b);\text{ where}$$

s=1, 2, . . . , n, n is a natural number greater than 1, $W_s$ is a weight of $X_s$, and b is an offset of the neuron. f indicates an activation function of the neuron, where the activation function is used for introducing a non-linear characteristic into the neural network, to convert an input signal in the neuron into an output signal. The output signal of the activation function may be used as an input to a next convolutional layer, and the activation function may be a sigmoid function. The neural network is a network constituted by connecting a plurality of single neurons together. To be specific, an output of a neuron may be an input to another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems to be complex, the DNN is actually not complex in terms of work at each layer, and is simply expressed as the following linear relationship expression: $\vec{y}=\alpha(W\cdot\vec{x}+\vec{b})$, where $\vec{x}$ is an input vector, $\vec{y}$ is an output vector, $\vec{b}$ is a bias vector, W is a weight matrix (also referred to as a coefficient), and α( ) is an activation function. Each layer simply performs such a simple operation on the input vector $\vec{x}$ to obtain the output vector $\vec{y}$ Due to a large quantity of DNN layers, quantities of coefficients W and bias vectors $\vec{b}$ are also large. Definitions of these parameters in the DNN are as follows: The coefficient W is used as an example. It is assumed that in a three-layer DNN, a linear coefficient from the fourth neuron at the second layer to the second neuron at the third layer is defined as $W_{24}^{3}$. The superscript 3 represents a layer at which the coefficient W is located, and the subscript corresponds to an output third-layer index 2 and an input second-layer index 4.

In conclusion, a coefficient from a $k^{th}$ neuron in an $(L-1)^{th}$ layer to a $j^{th}$ neuron in an $L^{th}$ layer is defined as Wk.

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of a trained deep neural network (a weight matrix formed by vectors W at a plurality of layers).

(3) Convolutional Neural Network

The convolutional neural network (CNN) is a deep neural network with a convolutional architecture. The convolutional neural network includes a feature extractor including a convolution layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature planes, and each feature plane may include some neurons arranged in a rectangle. Neurons of a same feature plane share a weight, and the shared weight herein is a convolution kernel. Sharing a weight may be understood as that a manner of extracting image information is unrelated to a location. The convolution kernel may be initialized in a form of a matrix of a random size. In a training process of the convolutional neural network, an appropriate weight may be obtained for the convolution kernel through learning. In addition, sharing the weight has advantages that connections between layers of the convolutional neural network are reduced, and a risk of overfitting is reduced.

(4) Loss Function

In a process of training the deep neural network, because it is expected that output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed until the deep neural network can predict the target value that is actually expected or a value that is very close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss occurs during output, and the parameters in the initial neural network model are updated based on back propagation error loss information, so that the error loss is reduced. The back propagation algorithm is a back propagation motion mainly dependent on the error loss, and is used for obtaining parameters of an optimal neural network model, for example, a weight matrix.

A wireless earphone may be used in cooperation with an electronic device such as a mobile phone, a notebook computer, or a watch, to process audio services such as media and a call of the electronic device, and some other data services. For example, the audio services may include media services such as music, a recording, a sound in a video file, background music in a game, or an incoming call prompt tone that are played by a user; and may further include, in a call service scenario such as a phone call, a WeChat voice message, an audio call, a video call, a game, or a voice assistant, playing voice data of a peer end for the user, collecting voice data of the user and sending the voice data to a peer end, or the like.

Figure 2:
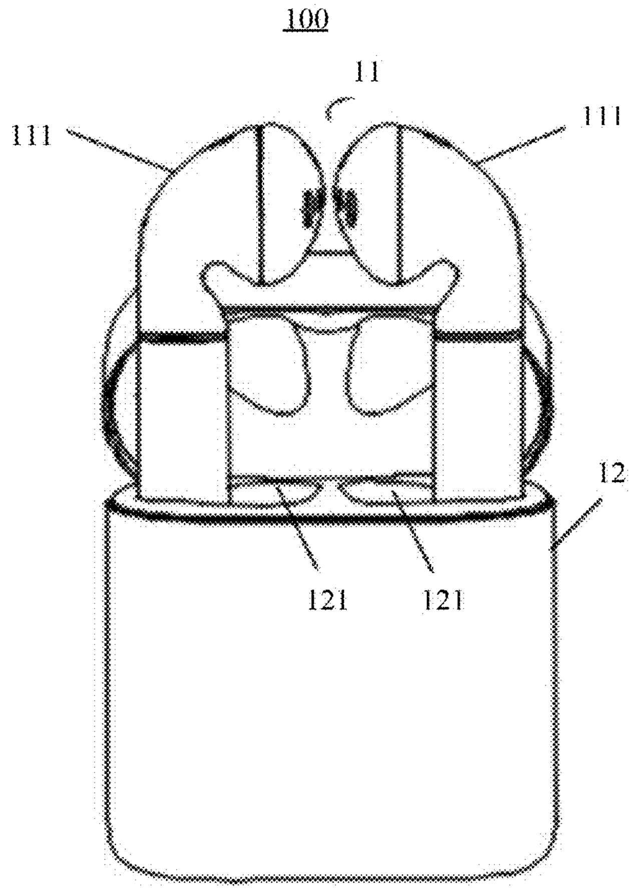
FIG. 2 is a schematic diagram of a wireless earphone system according to an embodiment of this application.

FIG. 2 is a schematic diagram of a wireless earphone system according to an embodiment of this application. As shown in FIG. 2, the wireless earphone system 100 may include a wireless earphone 11 and an earphone box 12.

The wireless earphone 11 includes a pair of earphone bodies that can be used in cooperation with a left ear and a right ear of a user, for example, a pair of earphone bodies 111. The wireless earphone 11 may be specifically an earplug earphone, a mounting ear earphone, an in-ear earphone, or the like. For example, the wireless earphone 11 may be a true wireless stereo (TWS) earphone.

The earphone box 12 may be configured to accommodate the earphone bodies 111. For example, the earphone box 12 includes two accommodation cavities 121. The accommodation cavities 121 are configured to accommodate the earphone bodies 111.

It should be noted that the earphone body 111 shown in FIG. 2 may include a body portion and a handle portion described in the following embodiments.

Figure 3:
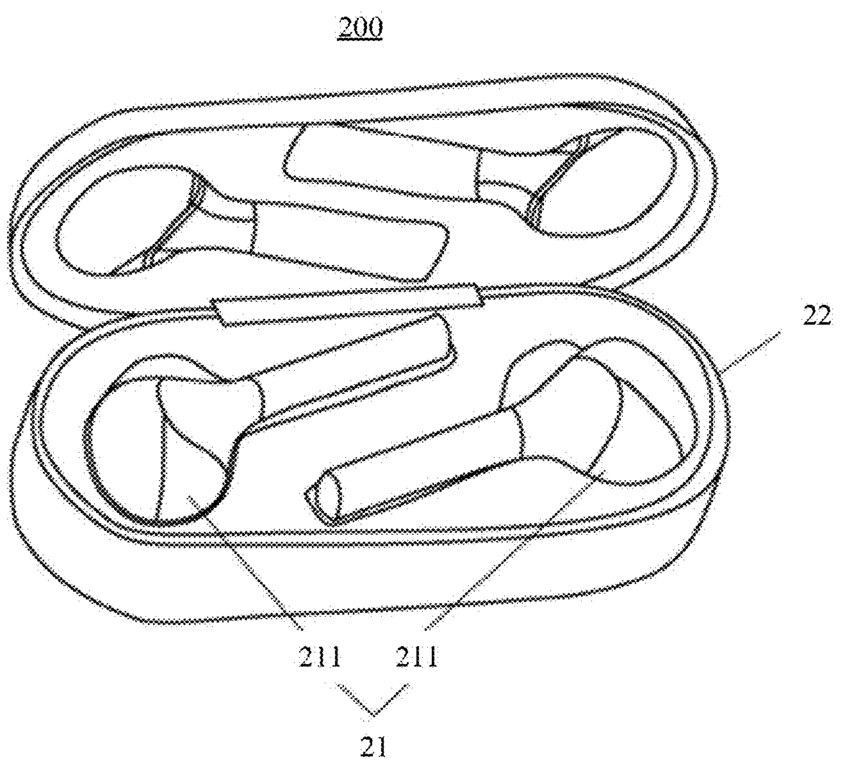
FIG. 3 is a schematic diagram of a wireless earphone system according to an embodiment of this application.

It should be noted that FIG. 2 is merely a schematic diagram of an example of a product form instance of the wireless earphone system. A wireless earphone provided in this embodiment of this application includes but is not limited to the wireless earphone 11 shown in FIG. 2, and an earphone box includes but is not limited to the earphone box 12 shown in FIG. 2. For example, the wireless earphone system provided in this embodiment of this application may alternatively be a wireless earphone system 200 shown in FIG. 3. As shown in FIG. 3, the wireless earphone system 200 includes a wireless earphone 21 and an earphone box 22. The wireless earphone 21 includes two earphone bodies 211. The earphone box 22 includes accommodation cavities configured to accommodate the earphone bodies 211. Certainly, some wireless earphones may alternatively include only one earphone body. Details are not described one by one in this embodiment of this application.

Figure 4:
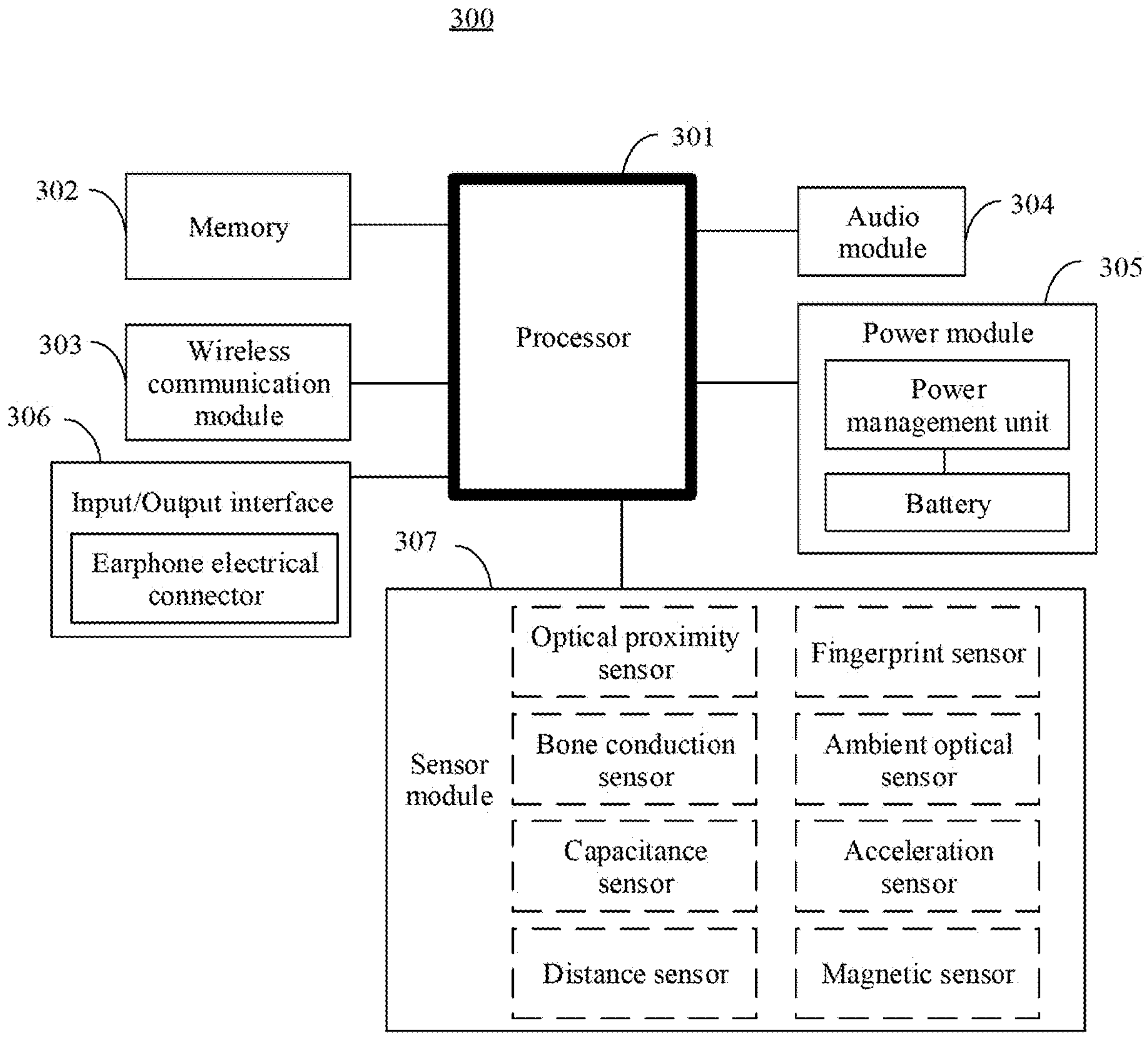
FIG. 4 is a schematic diagram of a structure of an earphone body of a wireless earphone.

For example, FIG. 4 is a schematic diagram of a structure of an earphone body 300 of a wireless earphone. The earphone body 300 may include a processor 301, a memory 302, a wireless communication module 303, an audio module 304, a power supply module 305, a plurality of input/output interfaces 306, a sensor module 307, and the like. The processor 301 may include one or more interfaces, used to connect to another component in the earphone body 300. The one or more interfaces may include an IO interface (also referred to as an IO pin), an interruption pin, a data bus interface, and the like. The data bus interface may include one or more of an SPI interface, an I2C interface, and an I3C interface. For example, in this embodiment of this application, the processor 301 may be connected to a magnetic sensor by using the IO pin, the interruption pin, or the data bus interface. The earphone body 300 is accommodated in an earphone box.

The memory 302 may be configured to store program code, for example, program code used to charge the earphone body 300, perform wireless pairing and connection between the earphone body 300 and another electronic device, or perform wireless communication between the earphone body 300 and an electronic device. The memory 302 may further store a Bluetooth address used to uniquely identify the wireless earphone. In addition, the memory 302 may further store connection data of an electronic device successfully paired with the wireless earphone before. For example, the connection data may be a Bluetooth address of the electronic device successfully paired with the wireless earphone. Based on the connection data, the wireless earphone can be automatically paired with the electronic device, and a connection between the wireless earphone and the electronic device does not need to be configured. For example, validity verification is not required. The Bluetooth address may be a media access control (MAC) address.

The processor 301 may be configured to execute the foregoing application program code, and invoke a related module to implement a function of the earphone body 300 in this embodiment of this application. For example, a charging function, a wireless communication function, an audio data playing function, and a box entry/exit detection function of the earphone body 300 are implemented. The processor 301 may include one or more processing units. Different processing units may be independent components, or may be integrated into one or more processors 301. The processor 301 may be specifically an integrated control chip, or may include a circuit including various active components and/or passive components, and the circuit is configured to perform a function of the processor 301 that is described in this embodiment of this application. The processor of the earphone body 300 may be a microprocessor.

The sensor module 307 may include a distance sensor and/or an optical proximity sensor. For example, as shown in FIG. 4, the sensor module 307 includes an optical proximity sensor and/or a distance sensor. For example, the processor 301 may detect, by using data collected by the distance sensor, whether there is an object near the earphone body 300. The processor 301 may obtain corresponding data from the sensor module 307, and determine, by processing the obtained data, whether the earphone body 300 is worn. When determining that the earphone body 300 is worn, the processor 301 may turn on a speaker of the earphone body 300. In some embodiments, the earphone body 300 may further include a bone conduction sensor, to obtain a bone conduction earphone. By using the bone conduction sensor, the processor 301 can obtain a vibration signal of a vibration bone of a vocal-cord part, and obtain a speech signal through parsing, to implement a speech function. For another example, an outer surface of the earphone body 300 may further include: a touch sensor, configured to detect a touch operation of the user; a fingerprint sensor, configured to detect a fingerprint of the user, identify a user identity, and the like; an ambient optical sensor, configured to adaptively adjust some parameters (such as a volume) based on perceived luminance of ambient light; and a capacitance sensor, configured to sense whether the earphone is being worn by the user. The capacitance sensor may consume significantly less power than the optical sensor. Therefore, in some configurations, optical sensors in a pair of earphones may be powered off when not in use and then turned on in response to outputs from capacitance sensors in the earphones. The capacitance sensor may also be used as a stand-alone sensor (for example, the capacitance sensor may be used in an earphone that does not use optical sensing).

The optical proximity sensor may provide a measurement of a distance between the sensor and an external object. The measurement may be represented by a standardized distance D (for example, a value between 0 and 1). A sensor system may include an acceleration sensor. For example, a three-axis acceleration sensor (for example, an acceleration sensor that generates outputs for three orthogonal axes: an X-axis, a Y-axis, and a Z-axis) may be used to perform acceleration measurement.

The wireless communication module 303 may be configured to support data exchange, between the earphone body 300 and another electronic device or an earphone box, of wireless communication including Bluetooth (BT), a global navigation satellite system (GNSS), a wireless local area network (WLAN) (such as a wireless fidelity (Wi-Fi) network), frequency modulation (FM), near field communication (NFC), and infrared (IR). In some embodiments, the wireless communication module 303 may be a Bluetooth chip. The earphone body 300 may perform pairing and establish a wireless connection with a Bluetooth chip of another electronic device by using the Bluetooth chip, to implement wireless communication between the earphone body 300 and the another electronic device through the wireless connection. For example, in this embodiment of this application, the wireless communication module 303 may be configured to: after the processor 301 determines that the earphone body 300 is out of the earphone box, send remaining power of the earphone box to an electronic device between which a wireless connection (for example, a Bluetooth connection) is established and the earphone body 300.

In addition, the wireless communication module 303 may further include an antenna. The wireless communication module 303 receives an electromagnetic wave through the antenna, performs frequency modulation and filtering processing on an electromagnetic wave signal, and sends a processed signal to the processor 301. The wireless communication module 303 may further receive a to-be-sent signal from the processor 301, perform frequency modulation and amplification on the signal, and convert a processed signal into an electromagnetic wave for radiation through the antenna.

The audio module 304 may be configured to manage audio data, so that the earphone body 300 inputs and outputs an audio signal. For example, the audio module 304 may obtain the audio signal from the wireless communication module 303, or transfer the audio signal to the wireless communication module 303, to implement functions such as answering/making a call, playing music, enabling/disabling a voice assistant of an electronic device connected to an earphone, and receiving/sending voice data of a user by using the earphone body. The audio module 304 may include a speaker (or referred to as an earpiece or a receiver) component configured to output an audio signal, a microphone (or referred to as a mike or a mic), a microphone radio circuit cooperating with the microphone, and the like. The speaker may be configured to convert an audio electrical signal into a sound signal and play the sound signal. The microphone may be configured to convert a sound signal into an audio electrical signal. The audio module 304 (for example, a speaker, also referred to as a "horn") includes a magnet (for example, magnetic iron). A magnetic field around the earphone body 300 includes a magnetic field generated by the magnet. The magnetic field generated by the magnet affects a magnitude of a magnetic induction intensity collected by the magnetic sensor of the earphone body 300. The power module 305 may be configured to provide a system power supply of the earphone body 300 to supply power to each module of the earphone body 300, and support the earphone body 300 in receiving charging input and the like. The power module 305 may include a power management unit (PMU) and a battery (that is, a first battery). The power management unit may include a charging circuit, a voltage drop regulation circuit, a protection circuit, an electricity quantity measurement circuit, and the like. The charging circuit may receive an external charging input. The voltage drop regulation circuit may output an electrical signal, input by the charging circuit, obtained after voltage transformation to the battery, to complete battery charging, or may output an electrical signal, input by the battery, obtained after voltage transformation to another module such as the audio module 304 or the wireless communication module 303. The protection circuit may be configured to prevent overcharge, overdischarge, short circuit, overcurrent, or the like of the battery. In some embodiments, the power module 305 may further include a wireless charging coil used to wirelessly charge the earphone body 300. In addition, the power management unit may be configured to monitor parameters such as a battery capacity, a battery cycle count, and a battery health status (electric leakage or impedance).

The plurality of input/output interfaces 306 may be configured to provide a wired connection for charging or communication between the earphone body 300 and the earphone box. In some embodiments, the input/output interface 306 may include an earphone electrical connector, and the earphone electrical connector is configured to conduct and transmit a current. When the earphone body 300 is put in the accommodation cavity of the earphone box, the earphone body 300 may establish an electrical connection to an electrical connector in the earphone box through the earphone electrical connector (for example, the earphone electrical connector is in direct contact with the electrical connector in the earphone box). After the electrical connection is established, the earphone box may charge the battery in the earphone body 300 by using a current transmission function of the earphone electrical connector and the electrical connector in the earphone box. For example, the earphone electrical connector may be a pogo pin, a spring pin, a spring plate, a conductive block, a conductive patch, a conductive sheet, a pin, a plug, a contact pad, a jack, a socket, or the like. In some other embodiments, after the electrical connection is established, the earphone body 300 may further perform data communication with the earphone box, for example, may receive pairing instructions from the earphone box.

It may be understood that a structure illustrated in this embodiment of this application does not constitute a specific limitation on the earphone body 300. The earphone body 300 may have more or fewer components than those shown in FIG. 4, or combine two or more components, or have different component configurations. For example, a housing of the earphone body may be further provided with a magnet (such as a magnetic iron) configured to adsorb the earphone box, so that the earphone body is accommodated in the accommodation cavity. A magnetic field around the earphone body 300 includes a magnetic field generated by the magnet. The magnetic field generated by the magnet affects a magnitude of a magnetic induction intensity collected by the magnetic sensor of the earphone body 300. For another example, an outer surface of the earphone body 300 may further include components such as a button, an indicator light (which may indicate a battery level, an incoming/outgoing call, a pairing mode, and the like), a display (which may prompt user-related information), and a dust filter (which may be used in cooperation with an earpiece). The button may be a physical button, a touch button (used in cooperation with the touch sensor), or the like, and is configured to trigger operations such as powering on, powering off, pausing, playing, recording, starting charging, and stopping charging.

The various components shown in FIG. 4 may be implemented in hardware, software, or a combination of hardware and software including one or more signal processing or application-specific integrated circuits.

The earphone box may further include a box power module and a plurality of input/output interfaces. The box power module may supply power to an electrical component in the earphone box, and the box power module may include a box battery (that is, a second battery). In some embodiments, the input/output interface may be a box electrical connector. The box electrical connector is electrically connected to an electrode of the box power module, and may be configured to conduct and transmit a current. The earphone box may include two pairs of box electrical connectors respectively corresponding to the two earphone bodies. After a pair of box electrical connectors in the earphone box respectively establish electrical connections to two earphone electrical connectors in the earphone body, the earphone box may charge the battery in the earphone body by using the box battery of the earphone box.

In some other embodiments, at least one touch control may be disposed on the earphone box, and may be configured to trigger a function such as pairing reset of the wireless earphone or charging the wireless earphone. The earphone box may further be provided with one or more battery level indicators, to prompt the user a power level of the battery in the earphone box and a power level of a battery in each earphone body in the earphone box.

In some other embodiments, the earphone box may further include components such as a processor and a memory. The memory may be configured to store application code, and the processor of the earphone box controls the application code to be executed, to implement functions of the earphone box. For example, the processor of the earphone box executes the application program code stored in the memory to charge the wireless earphone or the like after detecting that the wireless earphone is put in the earphone box and a cover of the earphone box is closed.

In addition, a charging interface may be further disposed on the earphone box, to charge the battery of the earphone box. The earphone box may further include a wireless charging coil, used to wirelessly charge the battery of the earphone box. It may be understood that the earphone box may further include other components. Details are not described herein.

Both a wireless earphone and a method for determining a wearing status of the wireless earphone in the following embodiments may be implemented in the wireless earphone having the foregoing hardware structure.

Figure 5:
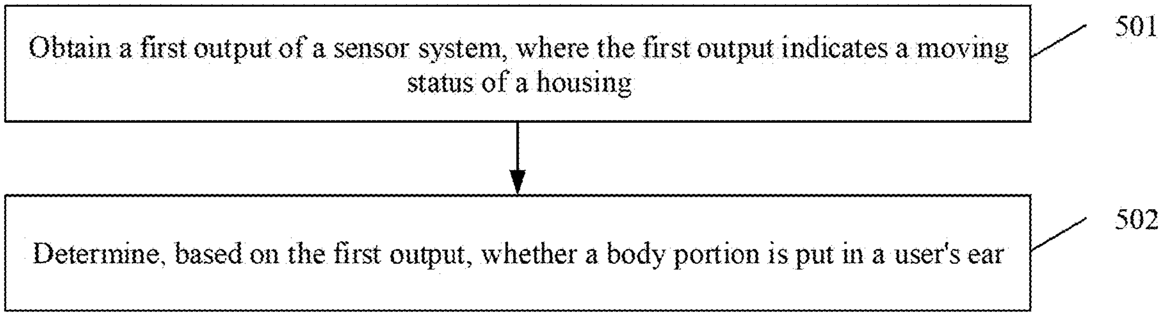
FIG. 5 is a schematic diagram of an embodiment of a method for determining a wearing status of a wireless earphone according to an embodiment of this application.

FIG. 5 is a schematic diagram of an embodiment of a method for determining a wearing status of a wireless earphone according to an embodiment of this application. As shown in FIG. 5, the method for determining the wearing status of the wireless earphone provided in this embodiment of this application includes the following steps.

501: Obtain a first output of a sensor system, where the first output indicates a moving status of a housing.

In this embodiment of this application, a processor in the wireless earphone may collect output data, user input, and another input of the sensor system, and may be configured to take a proper action in response to status of detection. For example, when determining that a user has put the wireless earphone in a user's ear, the processor may enable an audio playing function of the wireless earphone. When determining that the user has removed the wireless earphone from the user's ear, the processor may disable the audio playing function of the wireless earphone.

In this embodiment of this application, the wireless earphone may include a housing and a sensor system. The housing has a body portion and a handle portion extending from the body portion. The housing may be formed by, but is not limited to, the following materials such as plastic, metal, ceramic, glass, sapphire or other crystalline materials, a fiber-based composite (such as glass fiber and carbon fiber composite), a natural material (such as wood and cotton), another suitable material, and/or a combination of these materials. The housing may have the body portion and the handle portion that accommodate an audio port. During operation, the user may hold the handle portion and insert the body portion into the ear while holding the handle portion. When the wireless earphone is worn in the user's ear, the handle portion may be aligned with the gravity (gravity direction) of the earth.

In this embodiment of this application, the processor may obtain output data from the sensor system, and determine, based on the obtained output data, whether the wireless earphone is currently worn in the user's ear (that is, whether the body portion of the wireless earphone is currently put in the user's ear).

In this embodiment of this application, the sensor system may include an acceleration sensor, an optical proximity sensor, and a capacitance sensor. The processor may use the optical proximity sensor, the acceleration sensor, and the capacitance sensor to form a system for in-ear detection.

The optical proximity sensor may detect a nearby external object by using reflected light. The optical proximity sensor may include a light source such as an infrared light emitting diode. The infrared light emitting diode may emit light during operation. A light detector (for example, a photodiode) in the optical proximity sensor may monitor reflected infrared light. When no external object approaches the wireless earphone, the emitted infrared light is not reflected back towards the light detector, and an output of the optical proximity sensor is low. When the wireless earphone is close to the external object, some infrared light emitted from an infrared light detector may be reflected back to the light detector and may be detected. In this case, the existence of the external object may make an output signal of the optical proximity sensor high. When the external object is at a medium distance from the optical proximity sensor, a medium level output of the optical proximity sensor may be generated.

The acceleration sensor may sense current motion status information of the wireless earphone, and the acceleration sensor may sense acceleration along three different dimensions (for example, an X-axis, a Y-axis, and a Z-axis). For example, the Y axis may be aligned with the handle portion of the wireless earphone, the Z axis may vertically extend from the Y axis through a speaker in the wireless earphone, and the X axis may be perpendicular to a Y axis-Z axis plane.

The capacitance sensor may sense a status of contact with an external object. When the wireless earphone is in contact with the external object, an output signal of the capacitance sensor is high. When the wireless earphone is not in contact with the external object, an output signal of the capacitance sensor is low.

In this embodiment of this application, the processor may obtain a first output, a second output, and a third output of the sensor system, where the first output indicates a blocked status of the body portion, the second output indicates a contact status of the body portion, and the third output indicates a moving status of the housing.

In this embodiment of this application, the processor may obtain a second output, a third output, and a first output of the sensor system, where the second output indicates a blocked status of the body portion, the third output indicates a contact status of the body portion, and the first output indicates a moving status of the housing. For example, the second output may be from the optical proximity sensor, the third output may be from the capacitance sensor, and the first output may be from the acceleration sensor.

It should be noted that the processor may perform digital sampling on each output (the second output, the third output, and the first output) of the sensor system, and perform some calibration operations. These calibration operations may be used to compensate for a deviation, a scale error, a temperature impact, sensor inaccuracy, and the like of the sensor. Specifically, processing may be performed by using a low-pass filter and a high-pass filter, and/or by using another processing technology (for example, noise removal).

In this embodiment of this application, the processor may obtain the first output of the acceleration sensor once at a specific interval (for example, 0.1 s), where a data length of the first output may be a preset time (for example, Is), obtain the second output of the capacitance sensor once, where a data length of the second output may be a preset time (for example, 0.5 s), and obtain the third output of the optical proximity sensor once, where a data length of the third output may be a preset time (for example, 0.5 s).

502: Determine, based on the first output, whether the body portion is put in a user's ear.

In this embodiment of this application, whether the body portion is put in the user's ear may be determined based on the first output, the second output, and the third output.

In this embodiment of this application, after the processor obtains the second output, the third output, and the first output of the sensor system, where the second output indicates a blocked status of the body portion, the third output indicates a contact status of the body portion, and the first output indicates a moving status of the housing, whether the body portion is put in the user's ear may be determined based on the second output, the third output, and the first output.

In this embodiment of this application, in a first preset time period, when the second output indicates that the body portion has a second state, the third output indicates that the body portion has a third state, and the first output indicates that the body portion has a first state, it is determined that the body portion is put in the user's ear, where the second state indicates that the body portion is in a blocked state, the third state indicates that the body portion is in a contact state, and the first state indicates that the body portion is in a vibration state corresponding to a process of adjusting a position of the body portion in the ear.

In a process in which the user holds and puts the body portion of the wireless earphone in the ear, a finger may block a part of light entering the optical proximity sensor, and when the body portion of the wireless earphone is put in the ear, the ear may block a part of light entering the optical proximity sensor. In this case, the second output indicates that the body portion has a second state, and the second state indicates that the body portion is in a blocked state. Specifically, the second state indicates that the body portion is in a blocked state in which the body portion is blocked by the ear.

In a process in which the user holds and puts the body portion of the wireless earphone in the ear, a finger may not block light entering the optical proximity sensor, and when the body portion of the wireless earphone is put in the ear, the ear may block a part of light entering the optical proximity sensor. In this case, the second state indicates that the body portion changes from an unblocked state to the blocked state in which the body portion is blocked by the ear. In this case, the second state indicates that a blocked state in which the handle portion is blocked by a hand is changed to the blocked state in which the body portion is blocked by the ear.

Specifically, the second output is within a first preset range. The first preset range may be determined based on an actual situation. This is not limited in this embodiment of this application.

In this embodiment of this application, the user may hold the wireless earphone, and put the body portion of the wireless earphone in the ear. In this case, within the first preset time period, the third state indicates that the body portion is in a contact state in which the body portion is in contact with the ear. Specifically, the third state indicates that the body portion changes from a non-contact state to the contact state in which the body portion is in contact with the ear. Alternatively, the third state indicates that a contact state in which the handle portion is in contact with a hand is changed to the contact state in which the body portion is in contact with the ear.

In a process in which the user holds and puts the body portion of the wireless earphone in the ear, a finger may be in contact with the capacitance sensor, and when the body portion of the wireless earphone is put in the ear, the ear may be in contact with the capacitance sensor. In this case, the third state indicates that the contact state in which the handle portion is in contact with the hand is changed to the contact state in which the body portion is in contact with the ear.

In a process in which the user holds and puts the body portion of the wireless earphone in the ear, a finger may not be in contact with the capacitance sensor, and when the body portion of the wireless earphone is put in the ear, the ear may be in contact with the capacitance sensor. In this case, the third state indicates that the body portion changes from a non-contact state to the contact state in which the body portion is in contact with the ear.

Specifically, the third output is within a second preset range. The second preset range may be determined based on an actual situation. This is not limited in this embodiment of this application.

In this embodiment of this application, the user may hold the wireless earphone, and put the body portion of the wireless earphone in the ear. In this case, the first state indicates that the body portion changes from a moving state of moving to the ear to the vibration state corresponding to the process of adjusting the position of the body portion in the ear.

In a process in which the user holds and puts the body portion of the wireless earphone in the ear, after the wireless earphone is put in the ear, there is a process of adjusting a position of the wireless earphone in the ear. In this case, a corresponding vibration process occurs in the wireless earphone. Further, a plurality of wave crests correspondingly exist in the first output, and in the process of adjusting the position of the wireless earphone in the ear, data features at the plurality of wave crests meet specific conditions. Specifically, the first output indicates that a vibration amplitude of the body portion in a sub-period is within a first preset range, and a vibration frequency of the body portion is within a second preset range. The first preset period includes the sub-period, and the sub-period corresponds to the process in which the user adjusts the position of the wireless earphone in the ear.

In this embodiment of this application, in a first preset time period, when the second output indicates that the body portion has a second state, the third output indicates that the body portion has a third state, and the first output indicates that the body portion has a first state, it is determined that the body portion is put in the user's ear, where the second state indicates that the body portion is in a blocked state, the third state indicates that the body portion is in a contact state, and the first state indicates that the body portion is in a vibration state corresponding to a process of adjusting a position of the body portion in the ear. The second state indicates that the body portion changes from a first blocked state to a second blocked state, where light energy received when the body portion is in the second blocked state is greater than light energy received when the body portion is in the first blocked state.

Specifically, when the body portion is in the first blocked state, the second output is greater than a first threshold, and when the body portion is in the second blocked state, the second output is less than the first threshold.

In this embodiment of this application, when the user normally wears the wireless earphone, if the optical proximity sensor is not completely blocked, that is, light leaks into the ear, the processor may still consider that the wireless earphone is in a state of being put in the ear.

In this embodiment of this application, when the wireless earphone is held by the hand and remains stationary, it may be determined, based on the first output, that the body portion is not in the vibration state corresponding to the process of adjusting the position of the body portion in the ear. Further, it is determined that the wireless earphone is not put in the ear currently.

In this embodiment of this application, when the wireless earphone is put on a table or at another position, the optical proximity sensor is blocked by the hand, and the wireless earphone does not vibrate, it may be determined, based on the first output, that the body portion is not in the vibration state corresponding to the process of adjusting the position of the body portion in the ear. Further, it is determined that the wireless earphone is not put in the ear currently.

In this embodiment of this application, when the wireless earphone is held by the hand and shaken, it may be determined, based on the first output, that the body portion is not in the vibration state corresponding to the process of adjusting the position of the body portion in the ear. Further, it is determined that the wireless earphone is not put in the ear currently.

In this embodiment of this application, when the wireless earphone is first put close to the ear for a period of time, and then gently put into the ear (without a wrist raising action), it may be determined, based on the first output, that the body portion is not in the vibration state corresponding to the process of adjusting the position of the body portion in the ear. Further, it is determined that the wireless earphone is not put in the ear currently.

It should be noted that the body portion of the wireless earphone is a portion that needs to enter an ear canal when the user wears the wireless earphone, and may include a speaker. When wearing the earphone, the user may put the body portion of the wireless earphone in the ear by holding the handle portion of the wireless earphone.

The first output is merely a basis for determining whether the body portion is put in the user's ear, and does not mean that whether the body portion is put in the user's ear is determined only based on the first output. To be specific, whether the body portion is put in the user's ear may be determined either only based on the first output, or based on the first output and data information except the first output. That is, whether the body portion is put in the user's ear is determined based on at least the first output.

In the conventional technology, the wearing status of the wireless earphone (whether the body portion is put in the user's ear) is determined based on a contact status between the wireless earphone and an external object and a blocked status between the wireless earphone and the external object. In some interference scenarios (similar to the scenario in which the body portion is put in the user's ear), for example, the wireless earphone is put in a pocket or the wireless earphone is tightly held by a hand, if the wearing status of the wireless earphone is determined only based on the contact status and the blocked status, false detection may occur. However, although the contact statuses or the blocked statuses in the interference scenarios are similar, moving statuses of the wireless earphones are greatly different. Therefore, in this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

It should be noted that, in this embodiment, it does not mean that whether the body portion is put in the user's ear can be identified completely and accurately. Instead, in a processing result of a large amount of data, overall identification accuracy of the wearing status in this embodiment is high.

In some implementations, the first state indicates that the body portion changes from a moving state of moving to the ear to the vibration state corresponding to the process of adjusting the position of the body portion in the ear.

It should be noted that, in a process in which the user wears the wireless earphone, the user may hold the handle portion of the wireless earphone, and put the body portion in the ear. In this process, the body portion first has the moving state of displacement to the human ear, then enters the human ear, and has the vibration state corresponding to the process of adjusting the position of the body portion in the ear. The moving state may also be captured by the acceleration sensor. Correspondingly, it may also be determined, by parsing the first output that is output by the acceleration sensor, that the body portion has the moving state of moving to the ear.

In this embodiment, whether the body portion changes from the moving state of moving to the ear to the vibration state corresponding to the process of adjusting the position of the body portion in the ear is used as a basis for determining whether the body portion is put in the user's ear, so that the wearing status of the wireless earphone can be better distinguished from the foregoing interference scenarios, to accurately analyze the wearing status of the wireless earphone. This can improve accuracy of identifying the wearing status of the wireless earphone.

Optionally, the determining, based on the first output, whether the body portion is put in a user's ear includes: if the first output indicates at least that a vibration amplitude of the body portion is within a first preset range and a vibration frequency of the body portion is within a second preset range, determining that the body portion is put in the user's ear.

It should be noted that, in some implementations, the first output may be detected according to some detection algorithms, and mathematical features of the first output may be parsed. The mathematical features may include a vibration amplitude and a vibration frequency. When the vibration amplitude and the vibration frequency meet specific conditions, it is determined that the body portion is put in the user's ear.

It should be noted that the first preset range and the second preset range may be determined based on a characteristic of the moving status in the process in which the body portion is put in the user's ear. This is not limited herein. Optionally, the determining, based on the first output, whether the body portion is put in a user's ear includes: determining, by using a neural network model and by using at least the first output as a model input, whether the body portion is put in the user's ear.

It should be noted that the model input of the neural network model may include the first output or other data. For a technical solution implemented by using the neural network model, when the neural network model is trained, a large amount of acceleration data corresponding to the vibration state corresponding to the process of adjusting the position of the body portion in the ear may be used as a training sample, and the neural network model is trained, so that the neural network model can learn of a capability of identifying that the output of the sensor system at least indicates that the body portion has the first state.

In this embodiment, whether the body portion is put in the user's ear is determined based on the pre-trained neural network model. Because the neural network model can learn of more content than a common data processing algorithm, the neural network model has a better capability of distinguishing the wearing status of the wireless earphone from another interference scenario. This can improve accuracy of identifying the wearing status of the wireless earphone.

Optionally, the method further includes: obtaining a second output of the sensor system, where the second output indicates a blocked status of the body portion, and correspondingly, the determining, based on the first output, whether the body portion is put in a user's ear includes: determining, based on the first output and the second output, whether the body portion is put in the user's ear.

In this embodiment, in some scenarios, both the second output that indicates the blocked status of the body portion and the first output that indicates the moving status of the housing are used as bases for determining whether the body portion is put in the user's ear. In some scenarios, there is an interference scenario similar to the moving status of the housing in the process in which the body portion is put in the user's ear (for example, when the earphone is located on some objects with small amplitude and fast frequency vibrations). With reference to the blocked status, a capability of distinguishing the real wearing status of the wireless earphone from the foregoing interference scenarios can be learned. This can improve accuracy of identifying the wearing status of the wireless earphone.

Optionally, the second state indicates that the body portion has a blocked state in which the body portion is blocked by the ear.

In a process of wearing the wireless earphone, the user may hold the handle portion of the wireless earphone, and put the body portion in the ear. In this case, an optical proximity sensor located in the body portion may detect that the body portion of the wireless earphone is blocked, it may be determined, by parsing the second output of the optical proximity sensor, that the body portion has the blocked state in which the body portion is blocked by the ear.

In this embodiment, that the wireless earphone is worn is not determined by only determining whether the body portion is blocked, but that the wireless earphone is worn is determined only when it is determined that the body portion is blocked by the ear. In this embodiment, the wearing status of the wireless earphone can be better distinguished from another interference scenario (for example, blocked by another obstacle such as clothes), to accurately analyze the wearing status of the wireless earphone. This can improve accuracy of identifying the wearing status of the wireless earphone.

The foregoing may be implemented based on the neural network model. The neural network model is trained, so that the neural network model has a capability of distinguishing between the blocked state in which the earphone is blocked by the ear and another blocked state (for example, blocked by another obstacle such as clothes). Further, the second output is processed by using the pre-trained neural network model, to determine that the body portion has the blocked state in which the earphone is blocked by the ear.

Optionally, the second state indicates that the body portion changes from an unblocked state to the blocked state in which the body portion is blocked by the ear.

In a process of wearing the wireless earphone, the user may hold the handle portion of the wireless earphone. In this case, the body portion is in the unblocked state. After the body portion is put in the ear, the body portion is in the blocked state in which the body portion is blocked by the ear. In this case, the optical proximity sensor located in the body portion may detect change in the blocked state of the body portion of the wireless earphone, it may be determined, by parsing the second output of the optical proximity sensor, that the body portion changes from the unblocked state to the blocked state in which the body portion is blocked by the ear.

In this embodiment, the change in the blocked state of the body portion is used as a basis for determining the wearing status of the wireless earphone, so that the wearing status of the wireless earphone can be better distinguished from another interference scenario (for example, a similar scenario in which the wireless earphone is blocked by the ear), to accurately analyze the wearing status of the wireless earphone. This can improve accuracy of identifying the wearing status of the wireless earphone.

Optionally, the second state indicates that a blocked state in which the handle portion is blocked by a hand is changed to the blocked state in which the body portion is blocked by the ear.

In a process of wearing the wireless earphone, the user may hold the handle portion of the wireless earphone. In this case, the handle portion is in the blocked state in which the handle portion is blocked by the hand. After the body portion is put in the ear, the body portion is in the blocked state in which the body portion is blocked by the ear. Correspondingly, the optical proximity sensor located in the handle portion and the body portion may detect that the wireless earphone changes from the blocked state in which the handle portion is blocked by the hand to the blocked state in which the body portion is blocked by the ear, and may determine, by parsing the second output of the optical proximity sensor, that the blocked state in which the handle portion is blocked by the hand to the blocked state in which the body portion is blocked by the ear.

In this embodiment, the change in the blocked state of the handle portion and the body portion is used as a basis for determining the wearing status of the wireless earphone, so that the wearing status of the wireless earphone can be better distinguished from another interference scenario, to accurately analyze the wearing status of the wireless earphone. This can improve accuracy of identifying the wearing status of the wireless earphone.

Optionally, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In this embodiment of this application, when the user normally wears the wireless earphone, if light leaks into the ear because the earphone is loose in the ear, and when the body portion remains blocked by the ear, the value of the second output is greater than the first threshold, in this scenario, it may still be considered that the wireless earphone is in a state in which the wireless earphone is put in the ear. This embodiment can further improve accuracy of identifying the wearing status of the wireless earphone.

Optionally, the determining, based on the first output and the second output, whether the body portion is put in the user's ear includes: determining, by using a neural network model and by using at least the first output and the second output as model inputs, whether the body portion is put in the user's ear.

It should be noted that the model input of the neural network model may include the first output or other data. For a technical solution implemented by using the neural network model, when the neural network model is trained, a large amount of acceleration data corresponding to the vibration state corresponding to the process of adjusting the position of the body portion in the ear and optical proximity data that represents the blocked status of the wireless earphone may be used as training samples, and the neural network model is trained, so that the neural network model can learn of a capability of identifying that the output of the sensor system at least indicates that the body portion has the first state and the second state.

In this embodiment, whether the body portion is put in the user's ear is determined based on the pre-trained neural network model. Because the neural network model can learn of more content than a common data processing algorithm, the neural network model has a better capability of distinguishing the wearing status of the wireless earphone from another interference scenario. This can improve accuracy of identifying the wearing status of the wireless earphone.

Optionally, the method further includes: obtaining a third output of the sensor system, where the third output indicates a contact status of the body portion, and correspondingly, the determining, based on the first output, whether the body portion is put in a user's ear includes: determining, based on the first output and the third output, whether the body portion is put in the user's ear.

In this embodiment, in some scenarios, both the third output that indicates the contact status of the body portion and the first output that indicates the moving status of the housing are used as bases for determining whether the body portion is put in the user's ear. In some scenarios, there is an interference scenario similar to the moving status of the housing in the process in which the body portion is put in the user's ear (for example, when the earphone is suspended and some slight vibrations occur). A capability of distinguishing the real wearing status of the wireless earphone from the foregoing interference scenarios can be learned based on the contact status. This can improve accuracy of identifying the wearing status of the wireless earphone.

Optionally, the determining, based on the first output and the third output, whether the body portion is put in the user's ear includes: if the first output indicates that the body portion has a first state, and the third output indicates at least that the body portion has a third state, determining that the body portion is put in the user's ear, where the first state indicates that the body portion has a vibration state corresponding to a process of adjusting a position of the body portion in the ear, and the third state indicates that the body portion has a contact state. Optionally, the third state indicates that the body portion has a contact state in which the body portion is in contact with the ear.

In a process of wearing the wireless earphone, the user may hold the handle portion of the wireless earphone, and put the body portion in the ear. In this case, a capacitance sensor located in the body portion may detect that the body portion of the wireless earphone is in contact with the ear, it may be determined, by parsing the third output of the capacitance sensor, that the body portion has the contact state in which the body portion is in contact with the ear.

In this embodiment, that the wireless earphone is worn is not determined by only determining whether the body portion is in contact with the external object, but that the wireless earphone is worn is determined only when it is determined that the body portion is in contact with the external object. In this embodiment, the wearing status of the wireless earphone can be better distinguished from another interference scenario (for example, in contact with another obstacle such as clothes), to accurately analyze the wearing status of the wireless earphone. This can improve accuracy of identifying the wearing status of the wireless earphone.

The foregoing may be implemented based on the neural network model. The neural network model is trained, so that the neural network model has a capability of distinguishing between the contact state in which the earphone is in contact with the ear and another contact state (for example, in contact with another obstacle such as clothes). Further, the third output is processed by using the pre-trained neural network model, to determine that the body portion has the contact state in which the body portion is in contact with the ear.

Optionally, the third state indicates that the body portion changes from a non-contact state to the contact state in which the body portion is in contact with the ear.

In a process of wearing the wireless earphone, the user may hold the handle portion of the wireless earphone. In this case, the body portion is in the non-contact state. After the body portion is put in the ear, the body portion is in the contact state in which the body portion is in contact with the ear. In this case, the capacitance sensor located in the body portion may detect the change in the contact state of the body portion of the wireless earphone, it may be determined, by parsing the third output of the capacitance sensor, that the body portion changes from the non-contact state to the contact state in which the body portion is in contact with the ear.

In this embodiment, the change in the contact state of the body portion is used as a basis for determining the wearing status of the wireless earphone, so that the wearing status of the wireless earphone can be better distinguished from another interference scenario (for example, a similar scenario in which the wireless earphone is in the contact state in which the body portion is in contact with the ear), to accurately analyze the wearing status of the wireless earphone. This can improve accuracy of identifying the wearing status of the wireless earphone.

Optionally, the third state indicates that a contact state in which the handle portion is in contact with a hand is changed to the contact state in which the body portion is in contact with the ear.

In a process of wearing the wireless earphone, the user may hold the handle portion of the wireless earphone. In this case, the handle portion is in the contact state in which the handle portion is in contact with the hand. After the body portion is put in the ear, the body portion is in the contact state in which the body portion is contact with the ear. Correspondingly, the capacitance sensor located in the handle portion and the body portion may detect that the wireless earphone changes from the contact state in which the handle portion is in contact with the hand to the contact state in which the body portion is in contact with the ear, and may determine, by parsing the third output of the capacitance sensor, that the contact state in which the handle portion is in contact with the hand to the contact state in which the body portion is in contact with the ear.

In this embodiment, the change in the contact state of the handle portion and the body portion is used as a basis for determining the wearing status of the wireless earphone, so that the wearing status of the wireless earphone can be better distinguished from another interference scenario, to accurately analyze the wearing status of the wireless earphone. This can improve accuracy of identifying the wearing status of the wireless earphone. Optionally, the determining, based on the first output and the third output, whether the body portion is put in the user's ear includes: determining, by using a neural network model and by using at least the first output and the third output as model inputs, whether the body portion is put in the user's ear. Optionally, in an embodiment, the processor may use the second output, the third output, and the first output as model inputs, and determine, by using the neural network model, that the body portion is put in the user's ear.

Figure 6:
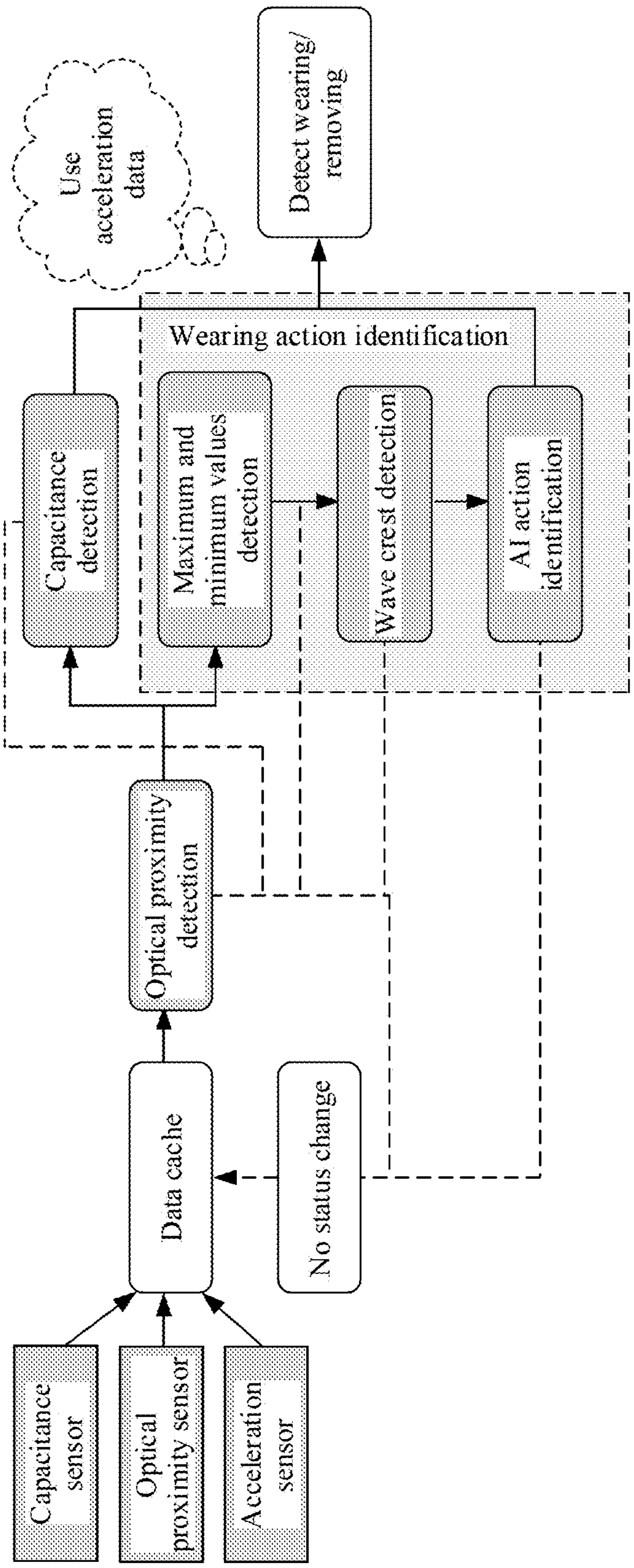
FIG. 6 is a schematic flowchart of a method for determining a wearing status of a wireless earphone.

In this embodiment of this application, FIG. 6 is a schematic flowchart of a method for determining a wearing status of a wireless earphone. As shown in FIG. 6, a processor may determine, based on a conventional algorithm, a threshold of a second output that is output by an optical proximity sensor and a threshold of a third output that is output by a capacitance sensor. If each of the two thresholds is greater than a threshold T1 or less than a threshold T2, the algorithm continues; otherwise, the process ends. A first output that is output by an acceleration sensor is input into a vibration detection module, and maximum and minimum values are used to distinguish whether the acceleration sensor is in a static state. If yes, wave crest detection is performed to distinguish between a smooth vibration and a violent vibration. If yes, the process continues; otherwise, the process ends. Then, AI-in-ear action identification may be used to capture deep features by using a neural network, and that features of negative samples such as random hand holding and a slight vibration in a pocket and positive samples such as a normal wearing action are different is used as criterion, to determine whether the current vibration is a wearing action. If yes, wearing detection returns to a wearing/removing state; otherwise, a returned result remains in the previous state.

Optionally, in an embodiment, within a first preset time period, if the processor determines that the second output is within a fifth preset range and the third output is within a sixth preset range, the processor uses the first output as a model input, and determines, by using a neural network model, that a body portion is put in a user's ear.

In this embodiment of this application, AI in-ear action identification is added to distinguish between an in-ear vibration and a common vibration, maintain more stable wearing status detection, improve wearing detection accuracy, and reduce a false detection rate. In addition, in a hierarchical detection solution, proper computing resource allocation is performed on a conventional detection algorithm and AI based on different calculation complexities. The conventional detection algorithm only needs to be responsible for signals in most simple scenarios, and an AI interaction action detection algorithm is used for a few complex signals. This ensures that the AI algorithm does not run all the time, reducing power consumption of the wireless earphone.

To describe effects of this application in various scenarios more clearly, in this embodiment, more detailed scenarios and corresponding descriptions are provided by using the following table.

TABLE 1

| Scenario | User behavior | Effect of this embodiment |
|---|---|---|
| From non-wearing to wearing | Hold the earphone with a hand | Play no audio |
| | Put the earphone on a table and block an optical proximity sensor by a hand, without vibration | Play no audio |
| | Put the earphone close to the ear for a period of time, and gently put the earphone in the ear (without raising a wrist), normal wearing | Play no audio |
| | Normally pick up the earphone and wear it | Play audio |
| From wearing to non-wearing | Normally wear the earphone and then remove it without blocking the earphone | Pause audio |
| Remain wearing | Normally wear the earphone and not completely block an optical proximity sensor, without raising a wrist | Resume to play audio |

When the user holds the earphone with the hand, because the body portion does not have a vibration state corresponding to a process of adjusting a position of the body portion in the ear, the earphone plays no audio.

When the user puts the earphone on the table and blocks the optical proximity sensor by the hand, and the earphone does not vibrate, because the body portion does not have a vibration state corresponding to a process of adjusting a position of the body portion in the ear, the earphone plays no audio.

When the user first puts the earphone close to the ear for a period of time, and then gently puts the earphone into the ear (without raising the wrist), and wears the earphone normally, because the body portion does not have a vibration state corresponding to a process of adjusting a position of the body portion in the ear, the earphone plays no audio.

When the user normally picks up the earphone and wears the earphone, because the body portion does not have a vibration state corresponding to a process of adjusting a position of the body portion in the ear (and meets blocking and contact conditions, for details, refer to the foregoing embodiments), the earphone plays audio.

When the user wears normally, the optical proximity sensor is not completely blocked, without raising the wrist, and when the body portion remains blocked by the ear, a value of the second output is greater than a first threshold, and the earphone resumes to play audio.

This application provides a method for determining a wearing status of a wireless earphone, where the wireless earphone includes a housing and a sensor system, and the housing has a body portion and a handle portion extending from the body portion. The method includes: obtaining a first output of the sensor system, where the first output indicates a moving status of the housing; and determining, based on the first output, whether the body portion is put in a user's ear. In this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

It should be noted that the neural network model in this embodiment may be deployed on a server on a cloud side or deployed on an earphone side (all neural network models in the following embodiments may also be deployed on the server on the cloud side or deployed on the earphone side).

If the neural network model is deployed on the server, after obtaining output data of the sensor system, an earphone sensor may send the output data to the server, so that the server processes the obtained output data by using the neural network model, obtains an identification result of the wearing status of the wireless earphone, and sends the identification result to the earphone side.

If the neural network model is deployed on the earphone side, after obtaining output data of the sensor system, an earphone sensor may process the obtained output data by using the neural network model, and obtain an identification result of the wearing status of the wireless earphone. The neural network model may be trained by the server side and sent to the earphone side.

Specifically, if the neural network model is deployed on the server, the system including the wireless earphone and the server in this embodiment of this application may perform the following steps:

the wireless earphone obtains a first output of the sensor system of the wireless earphone, where the first output indicates a moving status of the housing;

the wireless earphone sends the first output to the server;

the server determines, based on the first output, whether the body portion is put in a user's ear; and the server sends a determining result to the wireless earphone.

It should be noted that the determining result may indicate whether the body portion is put in the user's ear. For example, the determining result may be a character string.

Optionally, that the server determines, based on the first output, whether the body portion is put in a user's ear includes:

if the first output indicates at least that the body portion has a first state, the server determines that the body portion is put in the user's ear; where the first state indicates that the body portion has a vibration state corresponding to a process of adjusting a position of the body portion in the ear.

Optionally, the first state indicates that the body portion changes from a moving state of moving to the ear to the vibration state corresponding to the process of adjusting the position of the body portion in the ear.

Optionally, that the server determines, based on the first output, whether the body portion is put in a user's ear includes:

if the first output indicates at least that a vibration amplitude of the body portion is within a first preset range and a vibration frequency of the body portion is within a second preset range, the server determines that the body portion is put in the user's ear.

Optionally, that the server determines, based on the first output, whether the body portion is put in a user's ear includes:

the server determines, by using a neural network model and by using at least the first output as a model input, whether the body portion is put in the user's ear.

Optionally, the method further includes:

the wireless earphone obtains a second output of the sensor system, where the second output indicates a blocked status of the body portion; and the method includes:

the wireless earphone sends the second output to the server; and correspondingly, that the server determines, based on the first output, whether the body portion is put in a user's ear includes:

the server determines, based on the first output and the second output, whether the body portion is put in the user's ear.

Optionally, that the server determines, based on the first output and the second output, whether the body portion is put in the user's ear includes:

if the first output indicates that the body portion has a first state, and the second output indicates at least that the body portion has a second state, the server determines that the body portion is put in the user's ear; where the first state indicates that the body portion has a vibration state corresponding to a process of adjusting a position of the body portion in the ear, and the second state indicates that the body portion has a blocked state.

Optionally, the second state indicates that the body portion has a blocked state in which the body portion is blocked by the ear.

Optionally, the second state indicates that the body portion changes from an unblocked state to the blocked state in which the body portion is blocked by the ear.

Optionally, the second state indicates that a blocked state in which the handle portion is blocked by a hand is changed to the blocked state in which the body portion is blocked by the ear.

Optionally, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

Optionally, that the server determines, based on the first output and the second output, whether the body portion is put in the user's ear includes:

the server determines, by using a neural network model and by using at least the first output and the second output as model inputs, whether the body portion is put in the user's ear.

Optionally, the method further includes:

the wireless earphone obtains a third output of the sensor system, where the third output indicates a contact status of the body portion, and the method includes:

the wireless earphone sends the third output to the server; and correspondingly, that the server determines, based on the first output, whether the body portion is put in a user's ear includes:

the server determines, based on the first output and the third output, whether the body portion is put in the user's ear.

Optionally, that the server determines, based on the first output and the third output, whether the body portion is put in the user's ear includes:

if the first output indicates that the body portion has a first state, and the third output indicates that the body portion has a third state, the server determines that the body portion is put in the user's ear; where the first state indicates that the body portion has a vibration state corresponding to a process of adjusting a position of the body portion in the ear, and the third state indicates that the body portion has a contact state.

Optionally, the third state indicates that the body portion has a contact state in which the body portion is in contact with the ear.

Optionally, the third state indicates that the body portion changes from a non-contact state to the contact state in which the body portion is in contact with the ear.

Optionally, the third state indicates that a contact state in which the handle portion is in contact with a hand is changed to the contact state in which the body portion is in contact with the ear.

Optionally, that the server determines, based on the first output and the third output, whether the body portion is put in the user's ear includes:

the server determines, by using a neural network model and by using at least the first output and the third output as model inputs, whether the body portion is put in the user's ear.

Figure 7:
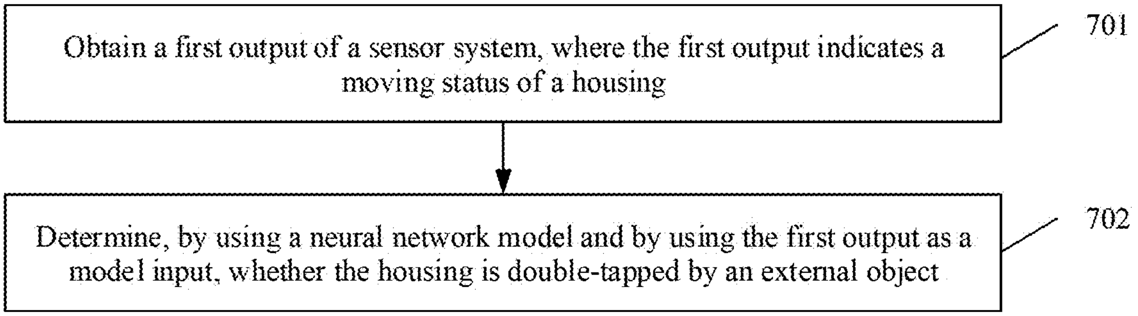
FIG. 7 is a schematic diagram of an embodiment of a method for determining a wearing status of a wireless earphone according to an embodiment of this application.

FIG. 7 is a schematic diagram of an embodiment of a method for determining a wearing status of a wireless earphone according to an embodiment of this application. As shown in FIG. 7, the method for determining the wearing status of the wireless earphone provided in this embodiment of this application includes the following steps.

701: Obtain a first output of a sensor system, where the first output indicates a moving status of a housing.

702: Determine, by using a neural network model and by using the first output as a model input, whether the housing is double-tapped by an external object.

Optionally, if it is determined that a data peak of the first output is greater than a second threshold, data energy of the first output is greater than a third threshold, and the first output includes two or more wave crests, it is determined, by using the neural network model and by using the third output as the model input, whether the housing is double-tapped by the external object.

Figure 8A:
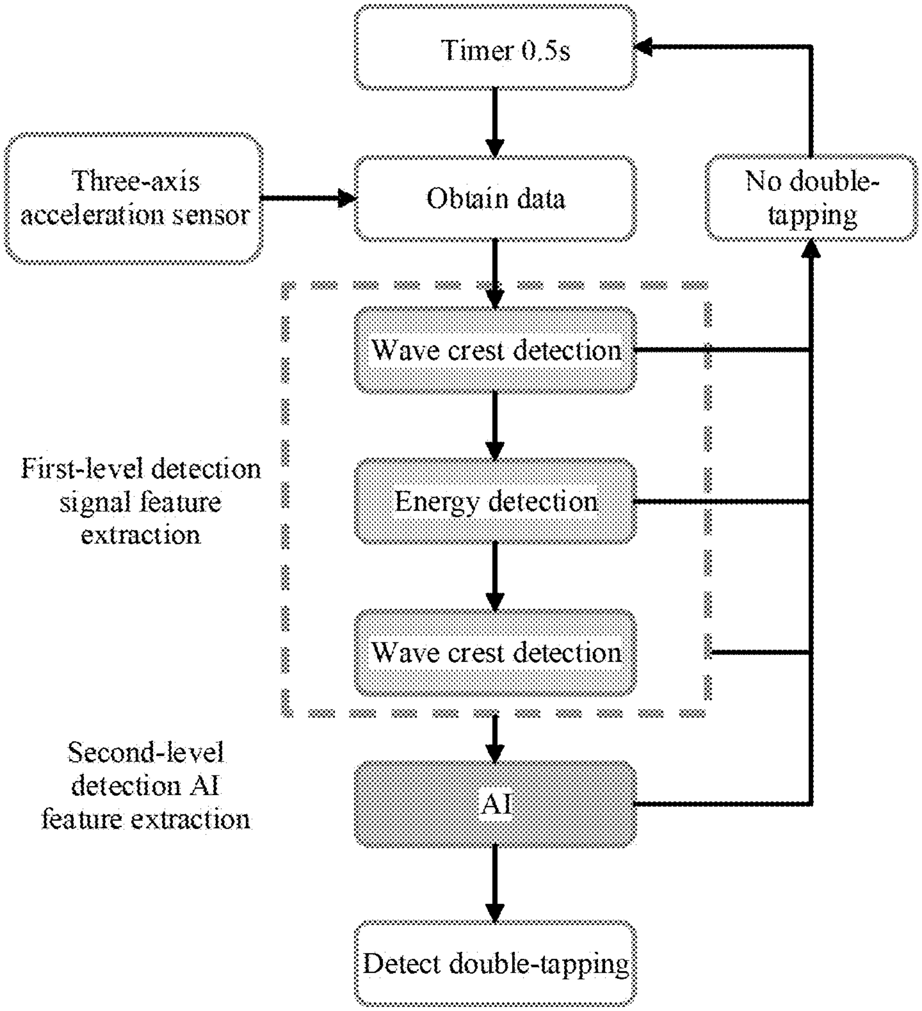
FIG. 8*a* is a schematic flowchart of a method for determining a double-tap status of a wireless earphone according to an embodiment of this application.

In this embodiment of this application, FIG. 8*a* is a schematic flowchart of a method for determining a double-tap status of a wireless earphone according to an embodiment of this application. As shown in FIG. 8*a*, a processor may detect a peak of data of a first output. If the peak is less than a set threshold, it is considered that there is no double-tapping, and the algorithm ends. If the peak is greater than the set threshold, the algorithm continues. Then, data energy of the first output may be detected. If the data energy is less than a set threshold, it is considered that there is no double-tapping, and the algorithm ends. If the data energy is greater than the set threshold, the algorithm continues. Then, a quantity of wave crests included in the data of the first output may be detected. If the quantity of wave crests is less than two, it is considered that there is no double-tapping; otherwise, the algorithm continues. Then, an AI double-tap identification model uses deep features extracted from positive and negative samples during training as a distinguishing criterion to obtain a final result of whether there is the double-tapping. Data features of negative samples such as walking with high heels, tapping, double-tapping on head, and running are different from those of positive samples such as quiet double-tapping and running double-tapping.

Specifically, if the neural network model is deployed on a server, the system including the wireless earphone and the server in this embodiment of this application may further perform the following steps:

the wireless earphone obtains a first output of the sensor system of the wireless earphone, where the first output indicates a moving status of the housing;

the wireless earphone sends the first output to the server;

the server determines, by using a neural network model and by using the first output as a model input, whether the housing is double-tapped by an external object; and the server sends a determining result to the wireless earphone.

It should be noted that the determining result may indicate whether the housing is double-tapped by the external object. For example, the determining result may be a character string.

Optionally, if the server determines that a data peak of the first output is greater than a second threshold, data energy of the first output is greater than a third threshold, and the first output includes two or more wave crests, the server determines, by using the neural network model and by using the third output as the model input, whether the housing is double-tapped by the external object.

In this embodiment of this application, accuracy of double-tap detection can be significantly improved. Through testing, a simple scenario such as no double-tapping can be filtered out by using a conventional signal feature extraction algorithm, and the AI double-tap identification model can be used to distinguish a double-tap signal from similar signals such as scenarios of running, head beat for twice, or high-heels. In addition, because a hierarchical detection solution is used, AI identification does not run all the time, greatly reducing power consumption of the earphone. In the conventional technology, only a conventional algorithm is used to perform feature extraction on an acceleration sensor. Therefore, obtained feature information is limited. As long as a value of the acceleration sensor changes sharply, no matter whether the sharp change is caused by the double-tapping, the sharp change may be identified as the double-tapping. This application combines a hierarchical detection solution of the conventional algorithm and the AI algorithm. A part considered as the double-tapping by the conventional algorithm is sent to the AI algorithm for action identification and determining, greatly improving accuracy and reducing a false detection rate.

An embodiment of this application provides a method for determining a double-tap status of a wireless earphone, where the wireless earphone includes a housing and a sensor system, and the method includes: obtaining a first output of the sensor system, where the first output indicates a moving status of the housing; and determining, by using a neural network model and by using the first output as a model input, whether the housing is double-tapped by an external object. In the foregoing manner, a false detection rate of double-tap detection is reduced.

Figure 8B:
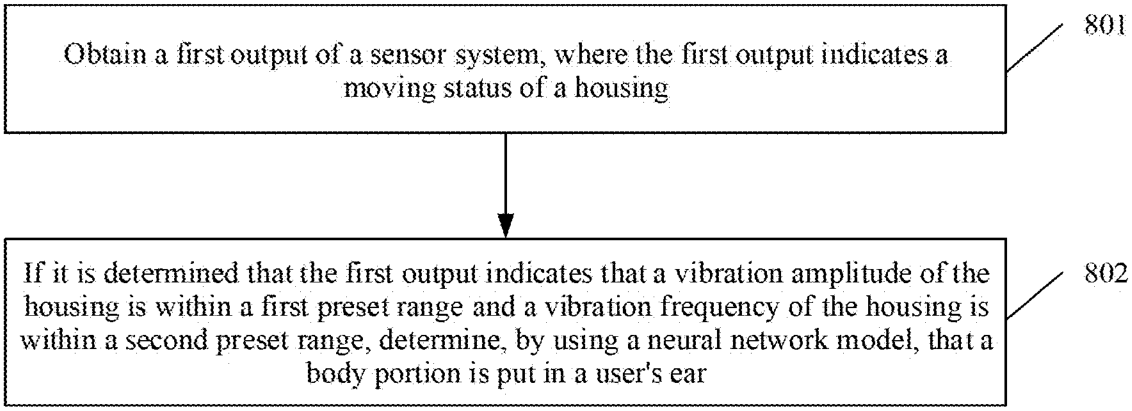
FIG. 8*b* is a schematic flowchart of a method for determining a wearing status of a wireless earphone according to an embodiment of this application.

FIG. 8*b* is a schematic flowchart of a method for determining a wearing status of a wireless earphone according to an embodiment of this application. The wireless earphone includes a housing and a sensor system, the housing has a body portion and a handle portion extending from the body portion, and the method includes the following steps.

801: Obtain a first output of the sensor system, where the first output indicates a moving status of the housing.

802: If it is determined that the first output indicates that a vibration amplitude of the housing is within a first preset range and a vibration frequency of the housing is within a second preset range, determine, by using a neural network model, that the body portion is put in a user's ear.

In this embodiment, a hierarchical detection solution is used. First, mathematical features (the vibration amplitude and the vibration frequency) of data output by the acceleration sensor are detected by using a common algorithm (computing power overheads of the algorithm may be small). Determining of the foregoing data features may be completed without using an algorithm with large computing power overheads or a neural network. Initial screening in the first step is completed by determining whether the determined mathematical features meet conditions corresponding to that the body portion is put in the user's ear (the vibration amplitude of the housing is within the first preset range and the vibration frequency of the housing is within the second preset range). Only data, output by the acceleration sensor, meeting the condition enters the neural network model (the computing power overheads are large), to detect the wearing status of the wireless earphone.

Specifically, the wearing status of the wireless earphone is detected by using the neural network model only when the vibration amplitude of the housing is within the first preset range and the vibration frequency of the housing is within the second preset range. Neural network model identification does not run all the time, greatly reducing power consumption of the earphone.

Optionally, the sensor system includes an optical proximity sensor, the optical proximity sensor is configured to output a second output, the second output represents a magnitude of light energy received by the optical proximity sensor, and the method includes:

obtaining the second output of the optical proximity sensor; and correspondingly, that if it is determined that the first output indicates that a vibration amplitude of the housing is within a first preset range and a vibration frequency of the housing is within a second preset range includes: if it is determined that the first output indicates that the vibration amplitude of the housing is within the first preset range and the vibration frequency of the housing is within the second preset range, and that the second output indicates that the magnitude of light energy received by the optical proximity sensor is within a third preset range, determining, by using a neural network model, that the body portion is put in a user's ear.

In this embodiment, the wearing status of the wireless earphone is detected by using the neural network model only when the vibration amplitude of the housing is within the first preset range and the vibration frequency of the housing is within the second preset range, and when the second output indicates that the magnitude of light energy received by the optical proximity sensor is within the third preset range. Neural network model identification does not run all the time, further reducing power consumption of the earphone.

Optionally, the sensor system includes a capacitance sensor, the capacitance sensor is configured to output a third output, and the method further includes: obtaining the third output of the capacitance sensor; and correspondingly, that if it is determined that the first output indicates that a vibration amplitude of the housing is within a first preset range and a vibration frequency of the housing is within a second preset range includes: if it is determined that the first output indicates that the vibration amplitude of the housing is within the first preset range, the vibration frequency of the housing is within the second preset range, and the third output is within a third preset range, determining, by using a neural network model, that the body portion is put in the user's ear.

In this embodiment, the wearing status of the wireless earphone is detected by using the neural network model only when the vibration amplitude of the housing is within the first preset range, the vibration frequency of the housing is within the second preset range, and the third output is within the third preset range. Neural network model identification does not run all the time, further reducing power consumption of the earphone.

Figure 8C:
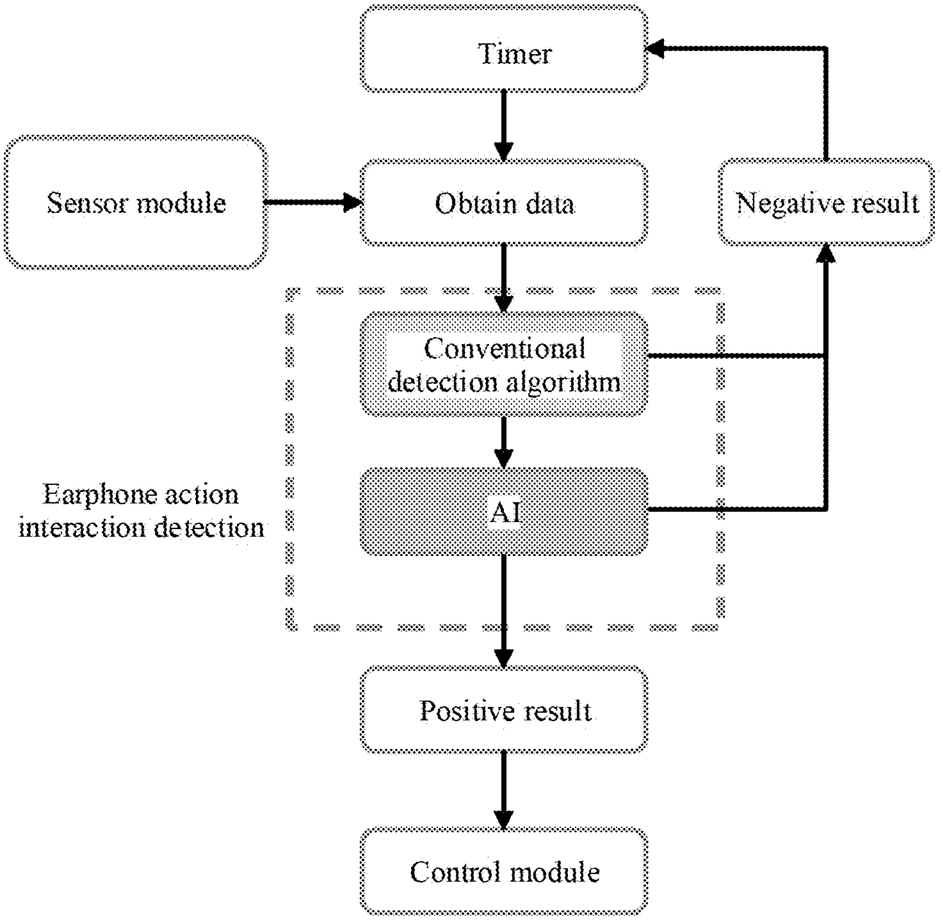
FIG. 8*c* is a schematic flowchart of a method for determining a wearing status of a wireless earphone according to an embodiment of this application.

FIG. 8*c* is a schematic flowchart of a method for determining a wearing status of a wireless earphone according to an embodiment of this application. A conventional detection algorithm may be understood as a step of initially screening the first output, the second output, and the third output in the foregoing embodiment. Details are not described herein again.

Figure 9A:
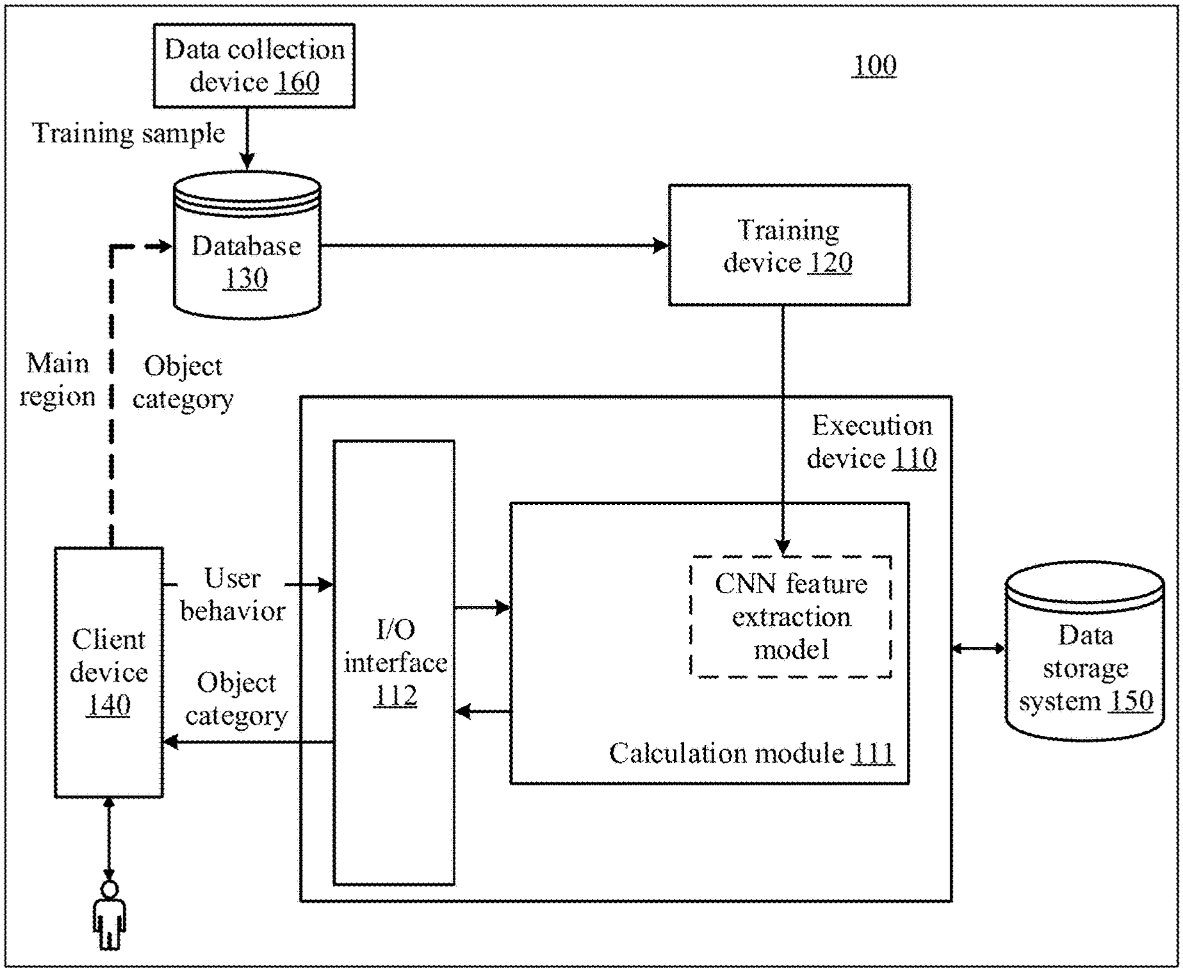
FIG. 9*a* is a schematic diagram of a system architecture according to an embodiment of this application.

Refer to FIG. 9*a*. An embodiment of this application provides a system architecture 900. As shown in the system architecture 900, a data collection device 960 is configured to collect training data, and store the training data in a database 930. The training device 920 performs training based on the training data maintained in the database 930 to obtain a neural network and the like. It should be noted that, in actual application, the training data maintained in the database 930 is not necessarily all collected by the data collection device 960, and may be received from another device. In addition, it should be noted that the training device 920 does not necessarily perform model training completely based on the training data maintained in the database 930, and may perform the model training by using training data obtained from a cloud or another place. The foregoing description should not be construed as a limitation on this embodiment of this application.

Target models/rules obtained through training by the training device 920 may be applied to different systems or devices, for example, applied to an execution device 910 shown in FIG. 9*a*. The execution device 910 may be a portable device such as a wireless earphone, or may be a server, a cloud, or the like. In FIG. 9*a*, an input/output (I/O) interface 912 is configured for the execution device 910, and is configured to exchange data with an external device. In a process in which the execution device 910 preprocesses the input data, or in a process in which a calculation module 911 of the execution device 910 performs related processing such as calculation (for example, implements a function of the neural network in this application), the execution device 910 may invoke data, code, and the like in a data storage system 950 for corresponding processing; or may store data, instructions, and the like obtained through corresponding processing into the data storage system 950. Finally, the I/O interface 912 returns a processing result such as the foregoing obtained information.

It should be noted that the training device 920 may generate corresponding target models/rules for different targets or different tasks based on different training data. The corresponding target models/rules may be used to implement the targets or complete the tasks, to provide a required result for the user.

In a case shown in FIG. 9*a*, the user may manually provide the input data. Manually providing may be performed through an interface provided by the I/O interface 912. In another case, the client device 940 may automatically send the input data to the I/O interface 912. If it is required that the client device 940 needs to obtain authorization from the user to automatically send the input data, the user may set corresponding permission on the client device 940. The user may check, on the client device 940, a result output by the execution device 910. Specifically, the result may be presented in a form of display, sound, an action, or the like. The client device 940 may also serve as a data collector to collect, as new sample data, the input data that is input to the I/O interface 912 and an output result that is output from the I/O interface 912 shown in the figure, and store the new sample data in the database 930. Certainly, the client device 940 may alternatively not perform collection. Instead, the I/O interface 912 directly stores, in the database 930 as new sample data, the input data that is input to the I/O interface 912 and the output result that is output from the I/O interface 912 in the figure.

It should be noted that FIG. 9*a* is merely a schematic diagram of a system architecture according to an embodiment of this application. A location relationship between the devices, the components, the modules, and the like shown in the figure does not constitute any limitation. For example, in FIG. 9*a*, the data storage system 950 is an external memory relative to the execution device 910, but in another case, the data storage system 950 may alternatively be disposed in the execution device 910.

Figure 9B:
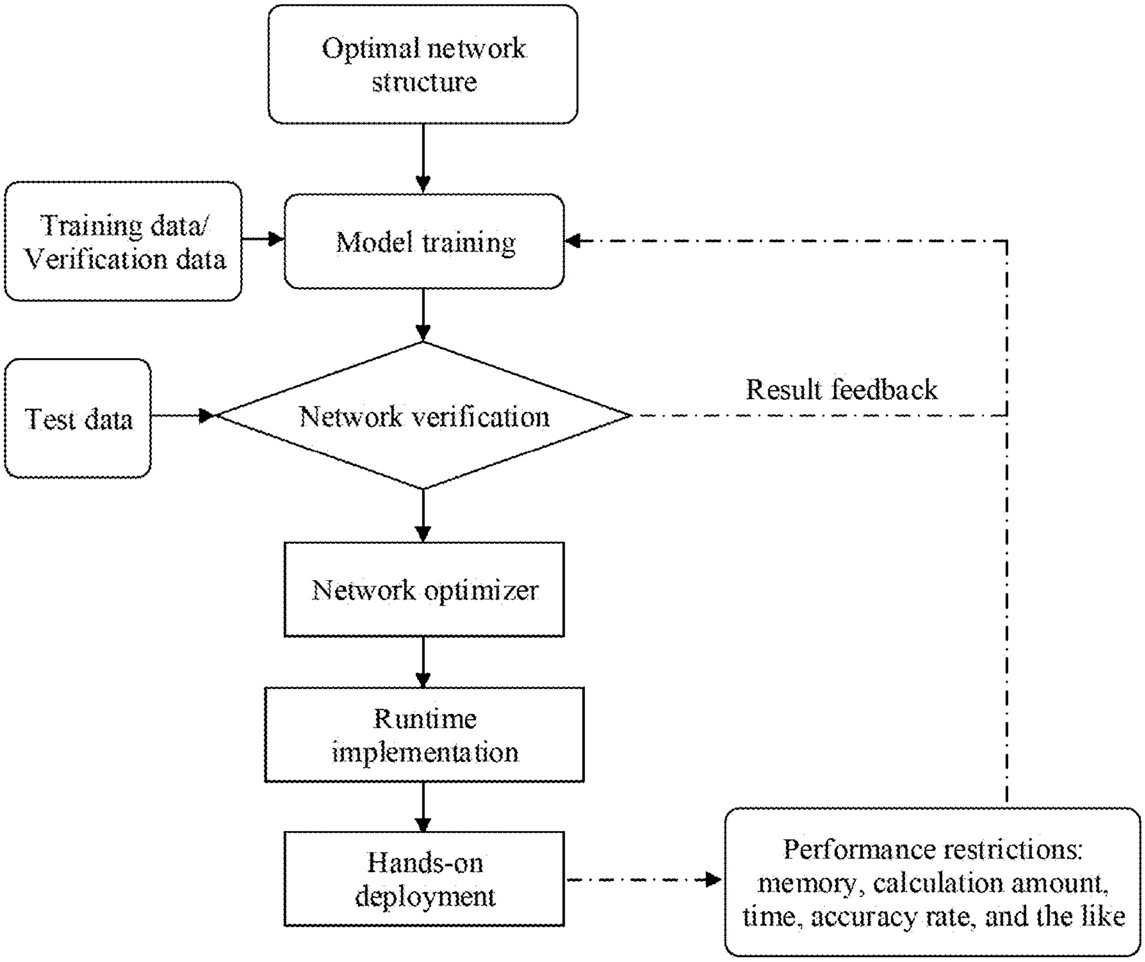
FIG. 9*b* is a schematic flowchart of neural network model deployment according to this application.

FIG. 9*b* is a schematic flowchart of neural network model deployment according to this application.

An optimal network structure module is configured to: define an operator type of each part of the network, for example, a convolution operator, an activation operator, or a pooling operator, with reference to a search policy, for example, randomly selecting two networks, and comparing and selecting a network with higher accuracy after training, and by analogy; or perform derivation on candidate networks, to finally select an optimal network structure with smaller memory and higher accuracy.

A model training module is configured to distinguish between positive and negative samples of earphone interaction data, for example, normal double-tap data is a positive sample and an accidental touch action, tap action data, or other data that has no actual tap action but is similar to the double-tapping in wearing the earphone is used as a negative sample, to form a model obtained through training by using a training set.

A network verification module is configured to: perform network verification by using data including same distribution and same data types as a test set; perform evaluation based on performance of the test set, for example, reference standards such as whether accuracy reaches 95% or higher and whether a false detection rate is reduced to less than 5%; continuously optimize parameters in an original structure, for example, changing a convolution kernel size and a step size and adjusting a learning rate reduction speed; continuously enrich the training set; and feed back the foregoing results to a training process, to obtain a final model that meets a requirement.

A network optimizer module is configured to send the obtained model to a network optimizer. A compiler parses the model to a runtime to implement a required format, and performs optimization measures based on the parsing. For example, a float type is optimized to fixed-point 16 bits to reduce memory, and a single calculation is optimized to parallel calculation to reduce operation time.

A runtime implementation module is configured to implement, in a runtime part, an engineering code part derived by a backend of the entire network.

It should be noted that the foregoing is merely a schematic diagram of a deployment procedure of the neural network model in this embodiment of this application, and does not constitute a limitation on this application.

Figure 10:
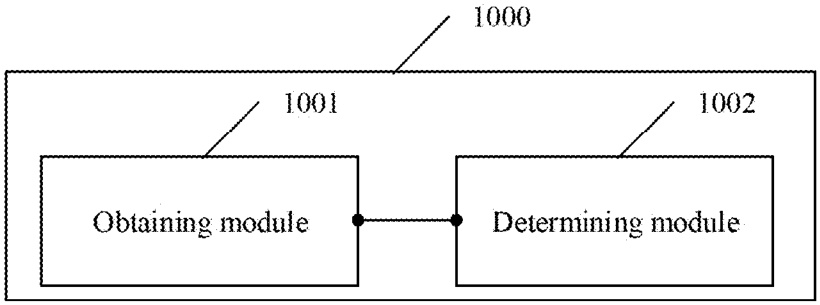
FIG. 10 is a schematic diagram of a structure of an apparatus for determining a wearing status of a wireless earphone according to an embodiment of this application.

Based on the embodiments corresponding to FIG. 1 to FIG. 9*b*, to better implement the foregoing solutions in embodiments of this application, the following further provides a related device configured to implement the foregoing solutions. Specifically, FIG. 10 is a schematic diagram of a structure of an apparatus 1000 for determining a wearing status of a wireless earphone according to an embodiment of this application. The apparatus 1000 for determining the wearing status of the wireless earphone may be a wireless earphone, and the wireless earphone includes a housing and a sensor system, the housing has a body portion and a handle portion extending from the body portion, and the apparatus 1000 for determining the wearing status of the wireless earphone includes:

an obtaining module 1001, configured to obtain a first output of the sensor system, where the first output indicates a moving status of the housing; and a determining module 1002, configured to determine, based on the first output, whether the body portion is put in a user's ear.

In some implementations, the determining module 1002 is specifically configured to:

if the first output indicates at least that the body portion has a vibration state corresponding to a process of adjusting a position of the body portion in the ear, determine that the body portion is put in the user's ear; where the first state indicates that the body portion has a vibration state corresponding to a process of adjusting a position of the body portion in the ear.

In some implementations, the first state indicates that the body portion changes from a moving state of moving to the ear to the vibration state corresponding to the process of adjusting the position of the body portion in the ear.

In some implementations, the determining module 1002 is specifically configured to:

if the first output indicates at least that a vibration amplitude of the body portion is within a first preset range and a vibration frequency of the body portion is within a second preset range, determine that the body portion is put in the user's ear.

In some implementations, the determining module 1002 is specifically configured to:

determine, by using a neural network model and by using at least the first output as a model input, whether the body portion is put in the user's ear.

In some implementations, the obtaining module 1001 is configured to obtain a second output of the sensor system, where the second output indicates a blocked status of the body portion, and correspondingly, the determining module 1002 is configured to determine, based on the first output and the second output, whether the body portion is put in the user's ear.

In some implementations, the determining module 1002 is specifically configured to:

if the first output indicates that the body portion has a first state, and the second output indicates at least that the body portion has a second state, determine that the body portion is put in the user's ear; where the first state indicates that the body portion has a vibration state corresponding to a process of adjusting a position of the body portion in the ear, and the second state indicates that the body portion has a blocked state.

In some implementations, the second state indicates that the body portion has a blocked state in which the body portion is blocked by the ear.

In some implementations, the second state indicates that the body portion changes from an unblocked state to the blocked state in which the body portion is blocked by the ear.

In some implementations, the second state indicates that a blocked state in which the handle portion is blocked by a hand is changed to the blocked state in which the body portion is blocked by the ear.

In some implementations, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

In some implementations, the determining module 1002 is specifically configured to:

determine, by using a neural network model and by using at least the first output and the second output as model inputs, whether the body portion is put in the user's ear.

In some implementations, the obtaining module 1001 is specifically configured to:

obtain a third output of the sensor system, where the third output indicates a contact status of the body portion, and correspondingly, the determining, based on the first output, whether the body portion is put in a user's ear includes:

the determining module 1002 is specifically configured to:

determine, based on the first output and the third output, whether the body portion is put in the user's ear.

In some implementations, the determining module 1002 is specifically configured to:

if the first output indicates that the body portion has a first state, and the third output indicates that the body portion has a third state, determine that the body portion is put in the user's ear; where the first state indicates that the body portion has a vibration state corresponding to a process of adjusting a position of the body portion in the ear, and the third state indicates that the body portion is in a contact state.

In some implementations, the third state indicates that the body portion has a contact state in which the body portion is in contact with the ear.

In some implementations, the third state indicates that the body portion changes from a non-contact state to the contact state in which the body portion is in contact with the ear.

In some implementations, the third state indicates that a contact state in which the handle portion is in contact with a hand is changed to the contact state in which the body portion is in contact with the ear.

In some implementations, the determining module 1002 is specifically configured to:

determine, by using a neural network model and by using at least the first output and the third output as model inputs, whether the body portion is put in the user's ear.

In this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

Figure 11:
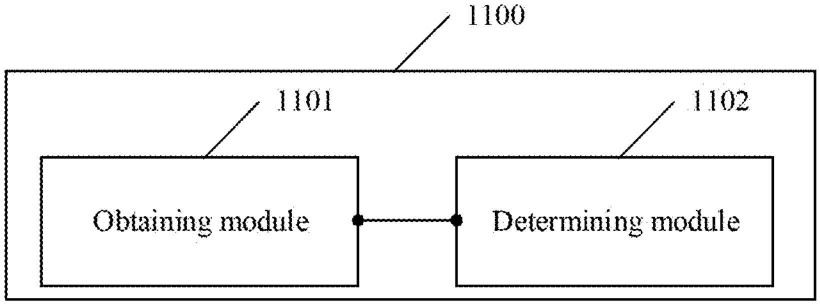
FIG. 11 is a schematic diagram of a structure of an apparatus for determining a double-tap status of a wireless earphone according to an embodiment of this application.

FIG. 11 is a schematic diagram of a structure of an apparatus for determining a double-tap status of a wireless earphone according to an embodiment of this application. As shown in FIG. 11, this application further provides an apparatus 1100 for determining a double-tap status of a wireless earphone. The wireless earphone includes a housing and a sensor system, and the apparatus includes:

an obtaining module 1101, configured to obtain a first output of the sensor system, where the first output indicates a moving status of the housing; and a determining module 1102, configured to determine, by using a neural network model and by using the first output as a model input, whether the housing is double-tapped by an external object.

In some implementations, the determining module 1102 is specifically configured to:

if it is determined that a data peak of the first output is greater than a second threshold, data energy of the first output is greater than a third threshold, and the first output includes two or more wave crests, determine, by using the neural network model and by using the third output as the model input, whether the housing is double-tapped by the external object.

Figure 12:
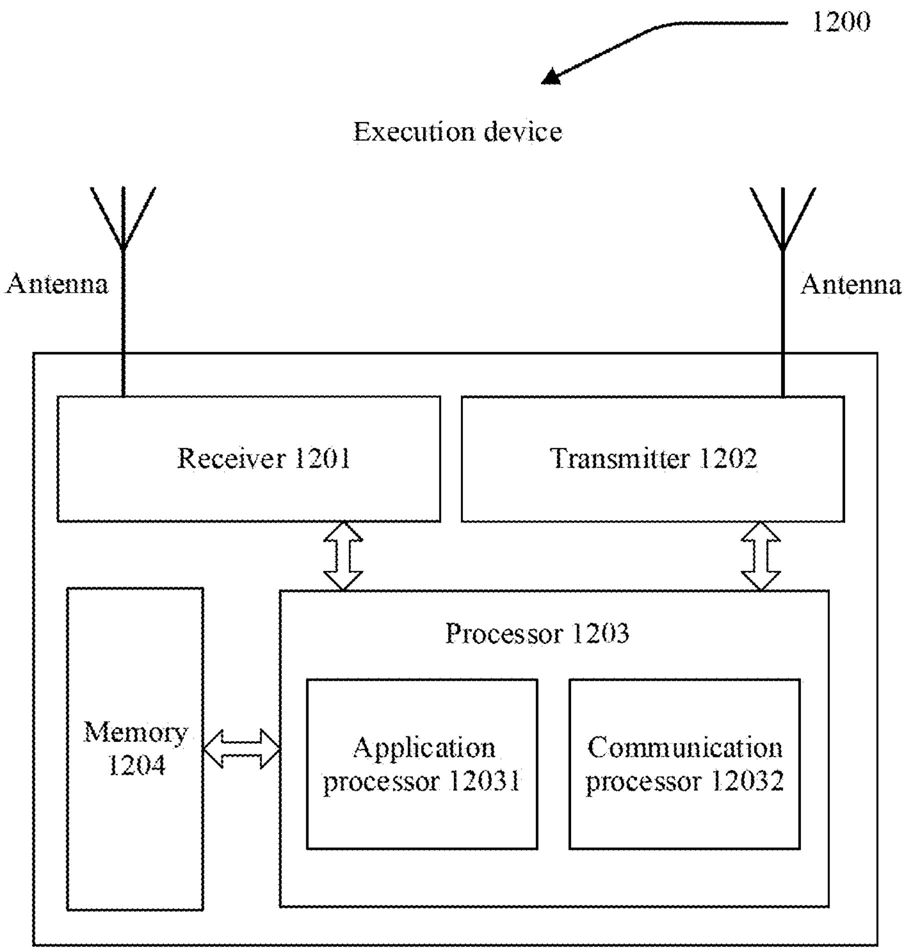
FIG. 12 is a schematic diagram of a structure of an execution device according to an embodiment of this application.

The following describes an execution device provided in an embodiment of this application. FIG. 12 is a schematic diagram of a structure of an execution device according to an embodiment of this application. The execution device 1100 may be specifically represented as a wireless earphone or the like. This is not limited herein. The apparatus for determining the wearing status of the wireless earphone described in the embodiment corresponding to FIG. 10 or the apparatus for determining the double-tap status of the wireless earphone described in the embodiment corresponding to FIG. 11 may be deployed on the execution device 1100. Specifically, the execution device 1100 includes a receiver 1201, a transmitter 1202, a processor 1203, and a memory 1204 (there may be one or more processors 1203 in the execution device 1100, and one processor is used as an example in FIG. 12). The processor 1203 may include an application processor 12031 and a communication processor 12032. In some embodiments of this application, the receiver 1201, the transmitter 1202, the processor 1203, and the memory 1204 may be connected through a bus or in another manner.

The memory 1204 may include a read-only memory and a random access memory, and provide instructions and data to the processor 1203. A part of the memory 1204 may further include a non-volatile random access memory (NVRAM). The memory 1204 stores a processor and operation instructions, an executable module or a data structure, or a subset thereof, or an extended set thereof. The operation instructions may include various operation instructions used to implement various operations.

The processor 1203 controls an operation of the execution device. In specific application, the components of the execution device are coupled together through a bus system. In addition to a data bus, the bus system may further include a power bus, a control bus, a status signal bus, and the like. However, for clear description, various types of buses in the figure are marked as the bus system.

The methods disclosed in the embodiments of this application may be applied to the processor 1203, or may be implemented by using the processor 1203. The processor 1203 may be an integrated circuit chip and has a signal processing capability. In an implementation process, steps in the foregoing methods can be implemented by using a hardware integrated logical circuit in the processor 1203, or by using instructions in a form of software. The processor 1203 may be a general-purpose processor, a digital signal processor (DSP), a microprocessor, or a microcontroller. The processor 1203 may further include an application-specific integrated circuit (ASIC), a field programmable gate array (FPGA) or another programmable logic device, a discrete gate, or a transistor logic device, or a discrete hardware component. The processor 1203 may implement or perform the method, the steps, and the logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and completes the steps in the foregoing methods in combination with hardware of the processor 1203.

The receiver 1201 may be configured to receive input digit or character information, and generate signal input related to related setting and function control of the execution device. The transmitter 1202 may be configured to output digital or character information through a first interface. The transmitter 1202 may be further configured to send instructions to a disk group through the first interface, to modify data in the disk group. The transmitter 1202 may further include a display device such as a display screen.

In this embodiment of this application, in one case, the processor 1203 is configured to perform the method for determining the wearing status of the wireless earphone that is performed by the execution device in the embodiment corresponding to FIG. 5, the method for determining the double-tap status of the wireless earphone that is shown in FIG. 7, or the method for determining the wearing status of the wireless earphone that is performed by the execution device in the embodiment corresponding to FIG. 8*b*. Specifically, the application processor 12031 is configured to:

obtain a first output of the sensor system, where the first output indicates a moving status of the housing, and determine, based on the first output, whether the body portion is put in a user's ear.

Optionally, the application processor 12031 is configured to:

if the first output indicates at least that the body portion has a vibration state corresponding to a process of adjusting a position of the body portion in the ear, determine that the body portion is put in the user's ear; where the first state indicates that the body portion has a vibration state corresponding to a process of adjusting a position of the body portion in the ear.

Optionally, the first state indicates that the body portion changes from a moving state of moving to the ear to the vibration state corresponding to the process of adjusting the position of the body portion in the ear.

Optionally, the determining, based on the first output, whether the body portion is put in a user's ear includes:

if the first output indicates at least that a vibration amplitude of the body portion is within a first preset range and a vibration frequency of the body portion is within a second preset range, determining that the body portion is put in the user's ear.

Optionally, the application processor 12031 is configured to:

determine, by using a neural network model and by using at least the first output as a model input, whether the body portion is put in the user's ear.

Optionally, the application processor 12031 is configured to:

obtain a second output of the sensor system, where the second output indicates a blocked status of the body portion, and correspondingly, the determining, based on the first output, whether the body portion is put in a user's ear includes:

determining, based on the first output and the second output, whether the body portion is put in the user's ear.

Optionally, the application processor 12031 is configured to:

if the first output indicates that the body portion has a first state, and the second output indicates at least that the body portion has a second state, determine that the body portion is put in the user's ear; where the first state indicates that the body portion has a vibration state corresponding to a process of adjusting a position of the body portion in the ear, and the second state indicates that the body portion has a blocked state.

Optionally, the second state indicates that the body portion has a blocked state in which the body portion is blocked by the ear.

Optionally, the second state indicates that the body portion changes from an unblocked state to the blocked state in which the body portion is blocked by the ear.

Optionally, the second state indicates that a blocked state in which the handle portion is blocked by a hand is changed to the blocked state in which the body portion is blocked by the ear.

Optionally, the sensor system includes an optical proximity sensor, the optical proximity sensor is configured to output the second output, the second output represents a magnitude of light energy received by the optical proximity sensor, and the second state indicates that a value of the second output is greater than a first threshold when the body portion remains blocked by the ear.

Optionally, the application processor 12031 is configured to:

determine, by using a neural network model and by using at least the first output and the second output as model inputs, whether the body portion is put in the user's ear.

Optionally, the application processor 12031 is configured to:

obtain a third output of the sensor system, where the third output indicates a contact status of the body portion, and correspondingly, the determining, based on the first output, whether the body portion is put in a user's ear includes:

determining, based on the first output and the third output, whether the body portion is put in the user's ear.

Optionally, the application processor 12031 is configured to:

if the first output indicates that the body portion has a first state, and the third output indicates that the body portion has a third state, determine that the body portion is put in the user's ear; where the first state indicates that the body portion has a vibration state corresponding to a process of adjusting a position of the body portion in the ear, and the third state indicates that the body portion is in a contact state.

Optionally, the third state indicates that the body portion has a contact state in which the body portion is in contact with the ear.

Optionally, the third state indicates that the body portion changes from a non-contact state to the contact state in which the body portion is in contact with the ear.

Optionally, the third state indicates that a contact state in which the handle portion is in contact with a hand is changed to the contact state in which the body portion is in contact with the ear.

Optionally, the determining, based on the first output and the third output, whether the body portion is put in the user's ear includes:

determining, by using a neural network model and by using at least the first output and the third output as model inputs, whether the body portion is put in the user's ear.

The application processor 12031 is configured to:

obtain a first output of the sensor system, where the first output indicates a moving status of the housing; and determine, by using a neural network model and by using the first output as a model input, whether the housing is double-tapped by an external object.

Optionally, the application processor 12031 is configured to:

if it is determined that a data peak of the first output is greater than a second threshold, data energy of the first output is greater than a third threshold, and the first output includes two or more wave crests, determine, by using the neural network model and by using the third output as the model input, whether the housing is double-tapped by the external object.

The application processor 12031 is configured to:

obtain a first output of the sensor system, where the first output indicates a moving status of the housing; and if it is determined that the first output indicates that a vibration amplitude of the housing is within a first preset range and a vibration frequency of the housing is within a second preset range, determine, by using a neural network model, that the body portion is put in the user's ear.

Optionally, the sensor system includes an optical proximity sensor, the optical proximity sensor is configured to output the second output, the second output represents a magnitude of light energy received by the optical proximity sensor, and optionally, the application processor 12031 is configured to:

obtain the second output of the optical proximity sensor; and correspondingly, that if it is determined that the first output indicates that a vibration amplitude of the housing is within a first preset range and a vibration frequency of the housing is within a second preset range includes:

if it is determined that the first output indicates that the vibration amplitude of the housing is within the first preset range and the vibration frequency of the housing is within the second preset range, and that the second output indicates that the magnitude of light energy received by the optical proximity sensor is within a third preset range, determining, by using a neural network model, that the body portion is put in the user's ear.

Optionally, the sensor system includes a capacitance sensor, the capacitance sensor is configured to output a third output, and optionally, the application processor 12031 is configured to:

obtain the third output of the capacitance sensor; and correspondingly, that if it is determined that the first output indicates that a vibration amplitude of the housing is within a first preset range and a vibration frequency of the housing is within a second preset range includes:

if it is determined that the first output indicates that the vibration amplitude of the housing is within the first preset range, the vibration frequency of the housing is within the second preset range, and the third output is within a third preset range, determining, by using a neural network model, that the body portion is put in the user's ear.

In this embodiment, the output, of the sensor system, indicating the moving status of the housing is used as a basis for determining the wearing status of the wireless earphone. A perspective of the moving status of the wireless earphone may be used as a reference for determining the wearing status of the earphone, so that the wearing status of the wireless earphone is accurately distinguished from the foregoing interference scenarios, to accurately analyze the wearing status of the wireless earphone. This can improve accuracy of identifying the wearing status of the wireless earphone.

An embodiment of this application further provides a computer program product. When the computer program product is run on a computer, the computer is enabled to perform the steps performed by the execution device in the methods described in the embodiments shown in FIG. 5, or the computer is enabled to perform the steps performed by the execution device in the method described in the embodiment shown in FIG. 7, or the computer is enabled to perform the method for determining the wearing status of the wireless earphone that is performed by the execution device in the embodiment corresponding to FIG. 8*b*.

An embodiment of this application further provides a computer-readable storage medium. The computer-readable storage medium stores a program used for signal processing.

When the program is run on a computer, the computer is enabled to perform the steps performed by the execution device in the method described in the embodiment shown in FIG. 5, or the computer is enabled to perform the steps performed by the training device in the method described in the embodiment shown in FIG. 7, or the computer is enabled to perform the method for determining the wearing status of the wireless earphone that is performed by the execution device in the embodiment corresponding to FIG. 8*b*.

The execution device provided in the embodiments of this application may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the method described in the embodiment shown in FIG. 5 or FIG. 7. Optionally, the storage unit is a storage unit in the chip, for example, a register or a cache; or the storage unit may be a storage unit that is in the radio access device end and that is located outside the chip, for example, a read-only memory (ROM), another type of static storage device that can store static information and instructions, or a random access memory (RAM).

Figure 13:
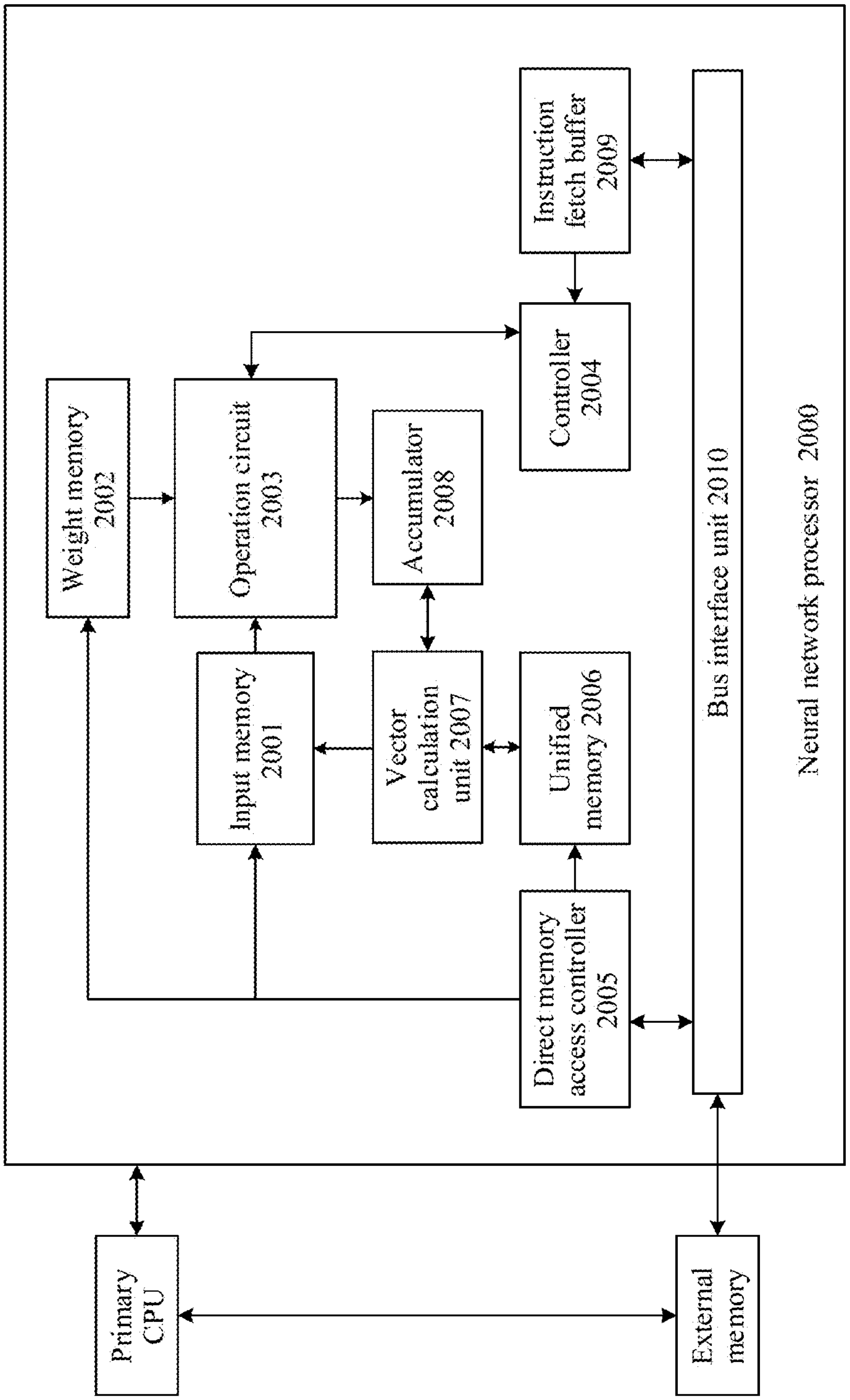
FIG. 13 is a schematic diagram of a structure of a chip according to an embodiment of this application.

Specifically, FIG. 13 is a schematic diagram of a structure of a chip according to an embodiment of this application. The chip may be represented as a neural network processor NPU 2000. The NPU 2000 is mounted to a host CPU as a coprocessor, and the host CPU allocates a task for the NPU 2000. A core part of the NPU is an operation circuit 2003, and a controller 2004 controls the operation circuit 2003 to extract matrix data in a memory and perform a multiplication operation.

In some implementations, the operation circuit 2003 internally includes a plurality of processing engines (PE). In some implementations, the operation circuit 2003 is a two-dimensional systolic array. The operation circuit 2003 may alternatively be a one-dimensional systolic array or another electronic circuit that can perform mathematical operations such as multiplication and addition. In some implementations, the operation circuit 2003 is a general-purpose matrix processor.

For example, it is assumed that there are an input matrix A, a weight matrix B, and an output matrix C. The operation circuit fetches data corresponding to the matrix B from a weight memory 2002, and buffers the data on each PE in the operation circuit. The operation circuit fetches data of the matrix A from an input memory 2001, to perform a matrix operation on the matrix B, and stores an obtained partial result or an obtained final result of the matrix into an accumulator 2008.

A unified memory 2006 is configured to store input data and output data. Weight data is directly transferred to the weight memory 2002 by using a direct memory access controller (DMAC) 2005. The input data is also transferred to the unified memory 2006 by using the DMAC.

BIU is the abbreviation for bus interface unit. A bus interface unit 2010 is configured to perform interaction between an AXI bus, and the DMAC and an instruction fetch buffer (IFB) 2009.

The bus interface unit 2010 (BIU for short) is configured for the instruction fetch buffer 2009 to obtain instructions from an external memory, and is further configured for the direct memory access controller 2005 to obtain raw data of the input matrix A or the weight matrix B from the external memory.

The DMAC is mainly configured to transfer input data in the external memory DDR to the unified memory 2006, or transfer the weight data to the weight memory 2002, or transfer the input data to the input memory 2001.

A vector calculation unit 2007 includes a plurality of operation processing units. When necessary, further processing is performed on output of the operation circuit, such as vector multiplication, vector addition, an exponential operation, a logarithmic operation, or value comparison. The vector calculation unit 2007 is mainly configured to perform network computing, such as batch normalization, pixel-level summation, and upsampling of a feature plane, on a non-convolutional/fully-connected layer in a neural network.

In some implementations, the vector calculation unit 2007 can store a processed output vector in the unified memory 2006. For example, the vector calculation unit 2007 may apply a linear function or a non-linear function to the output of the operation circuit 2003, for example, perform linear interpolation on a feature plane extracted at a convolutional layer. For another example, the linear function or the non-linear function is applied to a vector of an accumulated value to generate an activation value. In some implementations, the vector calculation unit 2007 generates a normalized value, a pixel-level sum, or a normalized value and a pixel-level sum. In some implementations, the processed output vector can be used as activation input of the operation circuit 2003, for example, to be used in a subsequent layer in the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private for the NPU hardware architecture.

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A method for determining a wearing status of a wireless earphone, wherein the wireless earphone comprises a housing and a sensor system, the housing has a body portion and a handle portion extending from the body portion, and the method comprises:

obtaining a first output of the sensor system, wherein the first output indicates a moving status of the housing; and determining, based on the first output, whether the body portion is put in a user's ear, wherein the determining, based on the first output, whether the body portion is put in a user's ear comprises:

if the first output further indicates at least that a vibration amplitude of the body portion is within a first preset range and a vibration frequency of the body portion is within a second preset range, determining that the body portion is put in the user's ear.

2. The method according to claim 1, wherein the determining, based on the first output, whether the body portion is put in a user's ear further comprises:

if the first output further indicates at least that the body portion has a first state, determining that the body portion is put in the user's ear; wherein the first state indicates that the body portion has a vibration state corresponding to a process of adjusting a position of the body portion in the user's ear.

3. The method according to claim 2, wherein the first state indicates that the body portion changes from a moving state of moving to the ear to the vibration state corresponding to the process of adjusting the position of the body portion in the user's ear.

4. The method according to claim 1, wherein the determining, based on the first output, whether the body portion is put in a user's ear comprises:

determining, by using a neural network model and by using at least the first output as an input to the neural network model, whether the body portion is put in the user's ear.

5. The method according to claim 1, wherein the method further comprises:

obtaining a second output of the sensor system, wherein the second output indicates a blocked status of the body portion, and wherein the determining, based on the first output, whether the body portion is put in a user's ear comprises:

determining, based on the first output and the second output, whether the body portion is put in the user's ear.

6. The method according to claim 5, wherein the determining, based on the first output and the second output, whether the body portion is put in the user's ear comprises:

if the first output further indicates that the body portion has a first state, and the second output further indicates at least that the body portion has a second state, determining that the body portion is put in the user's ear; wherein the first state indicates that the body portion has a vibration state corresponding to a process of adjusting a position of the body portion in the ear, and the second state indicates that the body portion has a blocked state.

7. The method according to claim 6, wherein the second state indicates that the body portion has a blocked state in which the body portion is blocked by the user's ear.

8. The method according to claim 6, wherein the second state indicates that the body portion changes from an unblocked state to the blocked state in which the body portion is blocked by the user's ear.

9. The method according to claim 6, wherein the second state indicates that a blocked state in which the handle portion is blocked by a hand is changed to the blocked state in which the body portion is blocked by the user's ear.

10. A wireless earphone comprising a housing, a sensor system, and a processor, wherein the sensor system is connected to the processor, and the housing has a body portion and a handle portion extending from the body portion; and wherein the processor is configured to:

obtain a first output of the sensor system, the first output indicating a moving status of the housing, and determine, based on the first output, whether the body portion is put in a user's ear, wherein the determine, based on the first output, whether the body portion is put in a user's ear comprises:

if the first output further indicates at least that a vibration amplitude of the body portion is within a first preset range and a vibration frequency of the body portion is within a second preset range, determining that the body portion is put in the user's ear.

11. The wireless earphone according to claim 10, wherein the processor is further configured to: if the first output further indicates at least that the body portion has a first state, determine that the body portion is put in the user's ear; wherein the first state indicates that the body portion has a vibration state corresponding to a process of adjusting a position of the body portion in the user's ear.

12. The wireless earphone according to claim 11, wherein the first state indicates that the body portion changes from a moving state of moving to the ear to the vibration state corresponding to the process of adjusting the position of the body portion in the user's ear.

13. The wireless earphone according to claim 10, wherein the processor is further configured to determine, by using a neural network model and by using at least the first output as an input to the neural network model, whether the body portion is put in the user's ear.

14. The wireless earphone according to claim 10, wherein the processor is further configured to:

obtain a second output of the sensor system, the second output indicating a blocked status of the body portion; and determine, based on the first output and the second output, whether the body portion is put in the user's ear.

15. The wireless earphone according to claim 14, wherein the processor is further configured to:

if the first output further indicates that the body portion has a first state, and the second output indicates at least that the body portion has a second state, determine that the body portion is put in the user's ear; wherein the first state indicates that the body portion has a vibration state corresponding to a process of adjusting a position of the body portion in the ear, and the second state indicates that the body portion has a blocked state.

16. The wireless earphone according to claim 15, wherein the second state further indicates that the body portion has a blocked state in which the body portion is blocked by the user's ear.

17. The wireless earphone according to claim 15, wherein the second state further indicates that the body portion changes from an unblocked state to the blocked state in which the body portion is blocked by the user's ear.

18. The wireless earphone according to claim 15, wherein the second state further indicates that a blocked state in which the handle portion is blocked by a hand is changed to the blocked state in which the body portion is blocked by the user's ear.

19. The method according to claim 1, wherein the first output includes a plurality of wave crests corresponding to a process of adjusting the wireless earphone in the user's ear, and wherein the method further comprises:

determining the vibration amplitude of the body portion and the vibration frequency based on the plurality of wave crests occurring in a sub-period corresponding to the process of adjusting the wireless earphone in the user's ear.

20. A method for determining a wearing status of a wireless earphone, wherein the wireless earphone comprises a housing and a sensor system, the housing has a body portion and a handle portion extending from the body portion, and the method comprises:

obtaining a first output of the sensor system, wherein the first output indicates a moving status of the housing;

obtaining a second output of the sensor system, wherein the second output indicates a blocked status of the body portion; and determining, based on the first output and the second output, whether the body portion is put in a user's ear, wherein the determining, based on the first output and the second output, whether the body portion is put in the user's ear comprises:

if the first output further indicates that the body portion has a first state, and the second output further indicates at least that the body portion has a second state, determining that the body portion is put in the user's ear; wherein the first state indicates that the body portion has a vibration state corresponding to a process of adjusting a position of the body portion in the ear, and the second state indicates that the body portion has a blocked state, wherein the second state indicates that a blocked state in which the handle portion is blocked by a hand is changed to the blocked state in which the body portion is blocked by the user's ear.

* * * * *